(12) United States Patent
Lee et al.

(10) Patent No.: US 12,141,412 B2
(45) Date of Patent: Nov. 12, 2024

(54) MOBILE TERMINAL AND METHOD OF CONTROLLING THE MOBILE TERMINAL

(71) Applicant: LG ELECTRONICS INC., Seoul (KR)

(72) Inventors: Seunghoon Lee, Seoul (KR); Jeehee Park, Seoul (KR); Chaesung Leem, Seoul (KR); Jiwoon Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1023 days.

(21) Appl. No.: 14/207,241

(22) Filed: Mar. 12, 2014

(65) Prior Publication Data

US 2014/0325428 A1 Oct. 30, 2014

(30) Foreign Application Priority Data

Apr. 29, 2013 (KR) ........................ 10-2013-0047514

(51) Int. Cl.
*G06F 3/0481* (2022.01)
*G06F 3/04817* (2022.01)
(Continued)

(52) U.S. Cl.
CPC ........ *G06F 3/0481* (2013.01); *G06F 3/04817* (2013.01); *G06F 3/0482* (2013.01); *G06F 3/0488* (2013.01); *G06F 2203/04803* (2013.01)

(58) Field of Classification Search
CPC .... G06F 3/0481; G06F 3/0482; G06F 3/0483; G06F 9/4443; G06F 3/04817;
(Continued)

(56) References Cited

U.S. PATENT DOCUMENTS 5,434,964 A * 7/1995 Moss ........................ G09G 5/14
715/759
5,714,971 A * 2/1998 Shalit .................... G06F 3/0481
715/792
(Continued)

FOREIGN PATENT DOCUMENTS

CN 102365617 2/2012
CN 102439861 5/2012
(Continued)

OTHER PUBLICATIONS

The State Intellectual Property Office of the People's Republic of China Application Serial No. 201410177938.0, Office Action dated Sep. 6, 2015, 12 pages.
(Continued)

*Primary Examiner* — Asher D Kells
(74) *Attorney, Agent, or Firm* — LEE, HONG, DEGERMAN, KANG & WAIMEY

(57) ABSTRACT

Provided is a mobile terminal including a display unit on which multiple divisional screen regions are output, and a controller that, when receiving an input for a division mode in which the display unit is divided into the multiple screen regions, generates a list region including an icon corresponding to an application and divides the displaying unit into a first and second screen regions with the list region in between, in which when a pair icon including a first icon corresponding to a first application and a second icon corresponding to a second application is selected from the list region, the controller executes the first and second applications on one of the first and second screen regions according to positions of the first and second icons arranged on the pair icon, respectively.

24 Claims, 19 Drawing Sheets

(51) Int. Cl.
*G06F 3/0482* (2013.01)
*G06F 3/0488* (2022.01)

(58) Field of Classification Search
CPC ......... G06F 3/0488; G06F 2203/04803; G06F 3/048; G06F 3/04842; G06F 3/14; G09G 5/14; G09G 2340/02; G09G 2340/12; H04M 1/72469
See application file for complete search history.

(56) References Cited

U.S. PATENT DOCUMENTS

| | | | | |
|---|---|---|---|---|
| 5,745,718 | A * | 4/1998 | Cline | G06F 3/0481 715/776 |
| 5,754,179 | A * | 5/1998 | Hocker | G06F 3/0481 715/835 |
| 6,043,817 | A * | 3/2000 | Bolnick | G06F 3/0481 715/788 |
| 6,088,220 | A * | 7/2000 | Katz | G06F 1/1616 341/22 |
| 6,195,094 | B1 * | 2/2001 | Celebiler | G06F 3/0481 715/764 |
| 6,415,305 | B1 * | 7/2002 | Agrawal | G06F 17/24 345/629 |
| 7,036,088 | B2 * | 4/2006 | Tunney | G06F 3/0482 715/779 |
| 7,581,192 | B2 * | 8/2009 | Stabb | G06F 9/4443 715/781 |
| 8,564,618 | B2 * | 10/2013 | Ryu | G06F 1/1626 345/629 |
| 8,914,064 | B2 * | 12/2014 | Tahk | G06F 1/1686 455/556.1 |
| 9,329,774 | B2 * | 5/2016 | Sareen | G06F 3/04883 |
| 9,612,673 | B2 * | 4/2017 | Lavallee | G06F 3/041 |
| 9,772,749 | B2 * | 9/2017 | Chaudhri | H04N 7/147 |
| 2002/0070974 | A1 * | 6/2002 | Barksdale | G06F 3/0481 715/788 |
| 2002/0103753 | A1 * | 8/2002 | Schimmel | G06Q 20/04 705/39 |
| 2004/0153973 | A1 * | 8/2004 | Horwitz | G06F 11/1402 715/255 |
| 2005/0005249 | A1 * | 1/2005 | Hill | G06F 3/0481 715/810 |
| 2005/0031092 | A1 * | 2/2005 | Umemura | H04M 3/58 348/E7.079 |
| 2005/0182753 | A1 * | 8/2005 | Warner | G06F 17/30873 |
| 2006/0020903 | A1 * | 1/2006 | Wang | G06F 3/0481 715/792 |
| 2008/0120571 | A1 * | 5/2008 | Chang | G06F 3/0483 715/810 |
| 2008/0158189 | A1 | 7/2008 | Kim | |
| 2009/0019385 | A1 * | 1/2009 | Khatib | G06F 9/451 715/765 |
| 2010/0060586 | A1 * | 3/2010 | Pisula | G06F 3/04886 345/169 |
| 2010/0138763 | A1 * | 6/2010 | Kim | G06F 3/04817 715/765 |
| 2010/0146431 | A1 * | 6/2010 | Raji | G06F 3/0481 715/781 |
| 2010/0248788 | A1 | 9/2010 | Yook et al. | |
| 2011/0107272 | A1 * | 5/2011 | Aguilar | G06F 3/04815 715/853 |
| 2011/0138328 | A1 * | 6/2011 | Ge | G06F 3/0482 715/811 |
| 2011/0145764 | A1 * | 6/2011 | Higuchi | G06F 3/0482 715/835 |
| 2011/0234746 | A1 * | 9/2011 | Saleh | G06F 3/041 348/14.03 |
| 2011/0252372 | A1 * | 10/2011 | Chaudhri | G06F 3/0486 715/835 |
| 2011/0252375 | A1 * | 10/2011 | Chaudhri | G06F 3/04886 715/835 |
| 2012/0030623 | A1 * | 2/2012 | Hoellwarth | G06F 3/04817 715/811 |
| 2012/0245447 | A1 * | 9/2012 | Karan | A61B 5/14532 600/365 |
| 2012/0249579 | A1 * | 10/2012 | Matthews | G06F 3/048 345/619 |
| 2013/0021377 | A1 * | 1/2013 | Doll | G09G 5/14 345/649 |
| 2013/0135178 | A1 * | 5/2013 | Miyahara | H04M 1/72522 345/1.3 |
| 2013/0187861 | A1 * | 7/2013 | Lavallee | G06F 3/041 345/173 |
| 2013/0219331 | A1 * | 8/2013 | Nelson | G06F 3/0481 715/799 |
| 2013/0332881 | A1 * | 12/2013 | Yook | G06F 3/04817 715/781 |
| 2014/0096069 | A1 * | 4/2014 | Boblett | G06F 3/017 715/783 |
| 2014/0137018 | A1 * | 5/2014 | Eichberger | G06F 17/21 715/769 |
| 2014/0164957 | A1 * | 6/2014 | Shin | G06F 3/0481 715/753 |
| 2014/0165006 | A1 * | 6/2014 | Chaudhri | G06F 3/04817 715/835 |

FOREIGN PATENT DOCUMENTS

| | | | | |
|---|---|---|---|---|
| EP | 1895382 A1 * | 3/2008 | ........... | G06F 1/1613 |
| KR | 10-2010-0107377 | 10/2010 | | |
| KR | 10-2012-0110834 | 10/2012 | | |

OTHER PUBLICATIONS

European Patent Office Application Serial No. 14163471.7 Search Report dated Mar. 25, 2015, 7 pages.
Korean Intellectual Property Office Application No. 10-2013-0047514, Office Action dated Oct. 10, 2019, 6 pages.

* cited by examiner

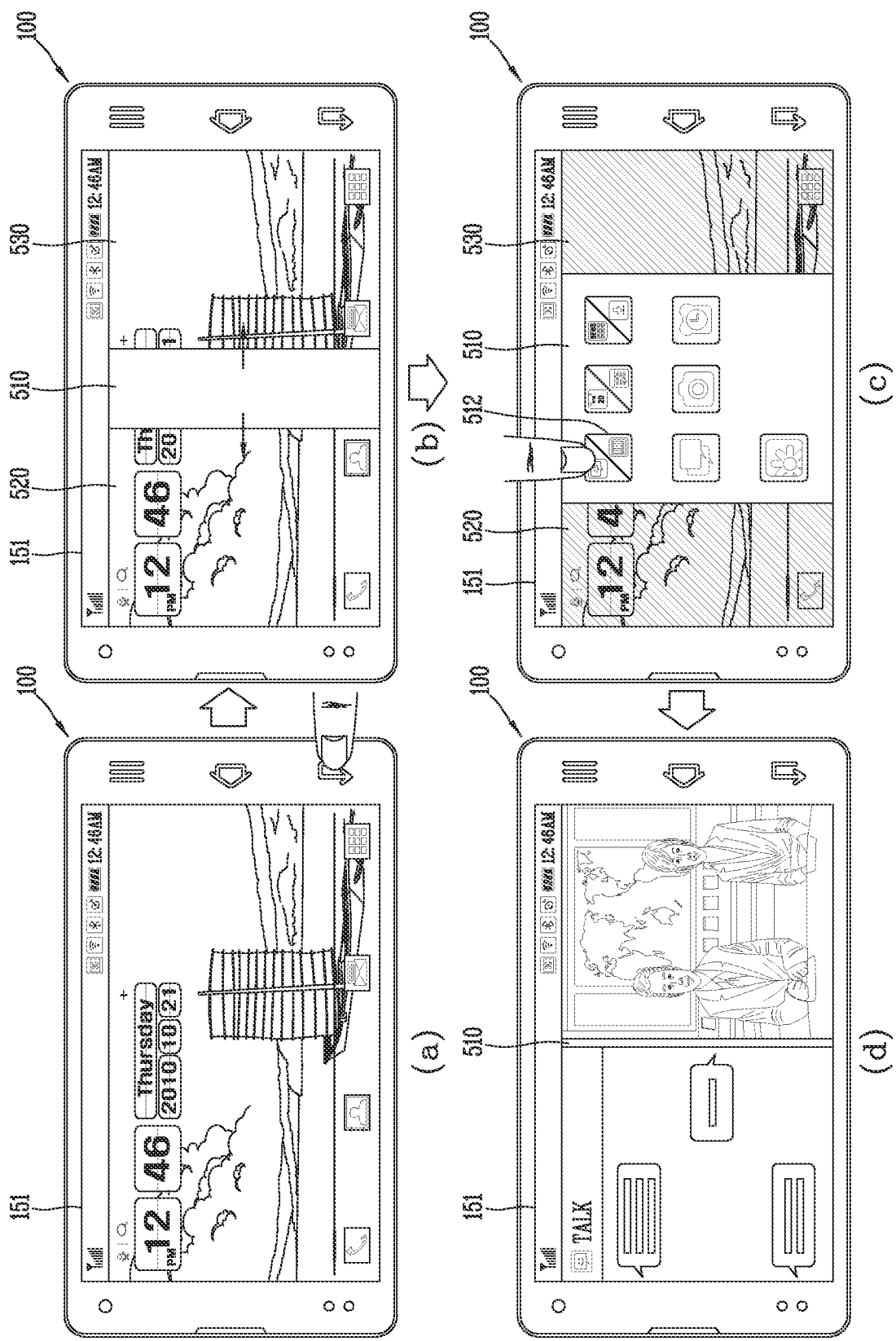

MOBILE TERMINAL AND METHOD OF CONTROLLING THE MOBILE TERMINAL

CROSS-REFERENCE TO RELATED APPLICATION

Pursuant to 35 U.S.C. § 119(a), this application claims the benefit of earlier filing date and right of priority to Korean Application No. 10-2013-0047514, filed on Apr. 29, 2013, the contents of which is incorporated by reference herein in its entirety.

BACKGROUND OF THE DISCLOSURE

1. Field of the Disclosure

The present invention relates to a mobile terminal and more particularly to a mobile terminal that is capable of dividing a screen and a method of controlling the mobile terminal

2. Background of the Disclosure

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player. Many efforts include not only changes and improvement of structural components implementing a mobile terminal but also software improvement to support and improve functions of the terminal.

Thanks to these improvements, various applications have been introduced to the market. There has been an increasing demand for multitasking that allows the multiple applications to be concurrently executed.

In addition, there has been increasing concern over a screen division method for use in the mobile terminal, by which it is ensured during multitasking that processes of executing an application are concurrently performed.

SUMMARY OF THE DISCLOSURE

Therefore, an aspect of the detailed description is to provide a mobile terminal that is capable of executing multiple applications on divisional screen regions at the same time, respectively, to improve user convenience and a method of controlling the mobile terminal.

To achieve these and other advantages and in accordance with the purpose of this specification, as embodied and broadly described herein, there is provided a mobile terminal including a display unit on which multiple divisional screen regions are output, and a controller that, when receiving an input for a division mode in which the display unit is divided into the multiple screen regions, generates a list region including an icon corresponding to an application and divides the displaying unit into a first and second screen regions with the list region in between, in which when a pair icon including a first icon corresponding to a first application and a second icon corresponding to a second application is selected from the list region, the controller executes the first and second applications on one of the first and second screen regions according to positions of the first and second icons arranged on the pair icon, respectively.

In the mobile terminal, the controller may output to the list region a pair icon that includes icons corresponding to an application that is executed on the first screen region immediately before entering the division mode and an application that is executed on the second screen region, respectively.

In the mobile terminal, the controller may output to the list region a pair icon that includes icons corresponding to multiple applications, respectively, which are selected according to the number of times that the execution occurs on each divisional screen region together.

In the mobile terminal, the controller may output to the list region an icon corresponding to an application that is selected according to the number of times that the execution occurs on at least one of the first and second screen regions.

In the mobile terminal, the controller may output to the list region an icon corresponding to an application that is selected according to the number of times that the execution occurs on each divisional screen region, together with the execution of an application to be executed on the first screen region.

In the mobile terminal, when the first icon corresponding to an application included in the list region is selected, the controller may select an application according to the number of times that the execution occurs on each divisional screen region, together with the execution of the application in the list region, and may output a pair icon that includes an icon corresponding to the selected application and the first icon.

In the mobile terminal, the controller may output to the second screen region an application including information relating to an application being executed on the first screen region.

In the mobile terminal, the controller may output to the second screen region an application that is selected according to the number of times that the execution occurs each divisional screen regions, together with the execution of an application being executed on the first screen region.

In the mobile terminal, when a predetermined control command is input while executing a predetermined application on the display unit, the controller may execute the application and a predetermined application corresponding to the control command on the divisional screen regions, respectively, which results from dividing the display unit.

In the mobile terminal, when a first object included in an application being executed on the first screen region is selected, the controller may transfer the first object to an application being executed on the second screen region and may enable the application being executed on the second screen region to perform a predetermined function using the first object.

To achieve these and other advantages and in accordance with the purpose of this specification, as embodied and broadly described herein, there is provided a method of controlling a mobile terminal, including receiving an input for entering a division mode in which to divide a display unit into multiple divisional screen regions, dividing the display unit into first and second screen regions with a list region in between by generating the list region including an icon corresponding to an application, and executing the application on at least one of the first and second screen regions when the icon corresponding to the application is selected, in which when a pair icon including a first icon corresponding to a first application and a second icon corresponding to a second application is selected from the list region, the executing of the application includes executing the first and second applications on one of the first and second screen regions according to positions of the first and second icons arranged on the pair icon.

In the method, the dividing of the display unit may include outputting to the list region a pair icon that includes icons corresponding to an application that is executed on the first screen region immediately before entering the division mode and an application that is executed on the second screen region, respectively.

In the method, the dividing of the display unit may include outputting to the list region a pair icon that includes icons corresponding to multiple applications, respectively, which are selected according to the number of times that execution occurs on each divisional screen region together.

In the method, the dividing of the display unit may include outputting to the list region an icon corresponding to an application that is selected according to the number of times that the execution occurs on at least one of the first and second screen regions.

In the method, the dividing of the display unit may include outputting to the list region an icon corresponding to an application that is selected according to the number of times that the execution occurs on each divisional screen region, together with the execution of an application to be executed on the first screen region.

In the method, the dividing of the display unit may include selecting an application according to the number of times that the execution occurs on each divisional screen region, together with the execution of the application in the list region, and outputting a pair icon that includes an icon corresponding to the selected application and the first icon, when the first icon corresponding to an application included in the list region is selected.

In the method, the executing of the application may include outputting the second screen region an application including information relating to an application being executed on the first screen region.

In the method, the executing of the application may include outputting to the second screen region an application that is selected according to the number of times that the execution occurs each divisional screen regions, together with the execution of an application being executed on the first screen region.

In the method, when a first object included in an application being executed on the first screen region is selected, the first object may be transferred to an application being executed on the second screen region and the application being executed on the second screen region may be enabled to perform a predetermined function using the first object.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to stationary terminals such as digital TV, desktop computers and the like excluding a case of being applicable only to the mobile terminals.

Figure 1:
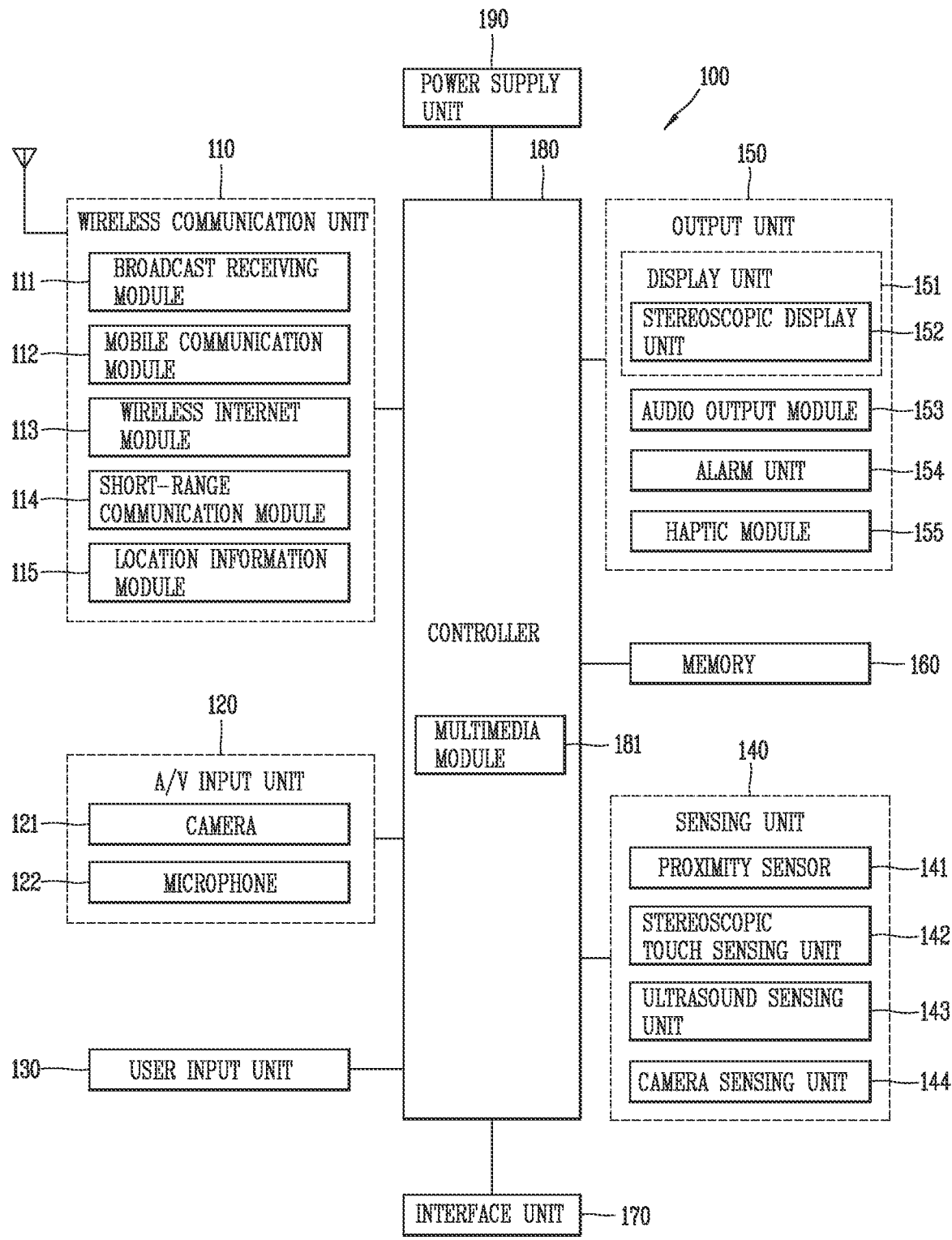
FIG. 1 is a block diagram illustrating a mobile terminal according to an embodiment of the present invention.

FIG. 1 is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component 110 to 190 is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module or a wireless fidelity (WiFi) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, a switchable scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Figure 2A:
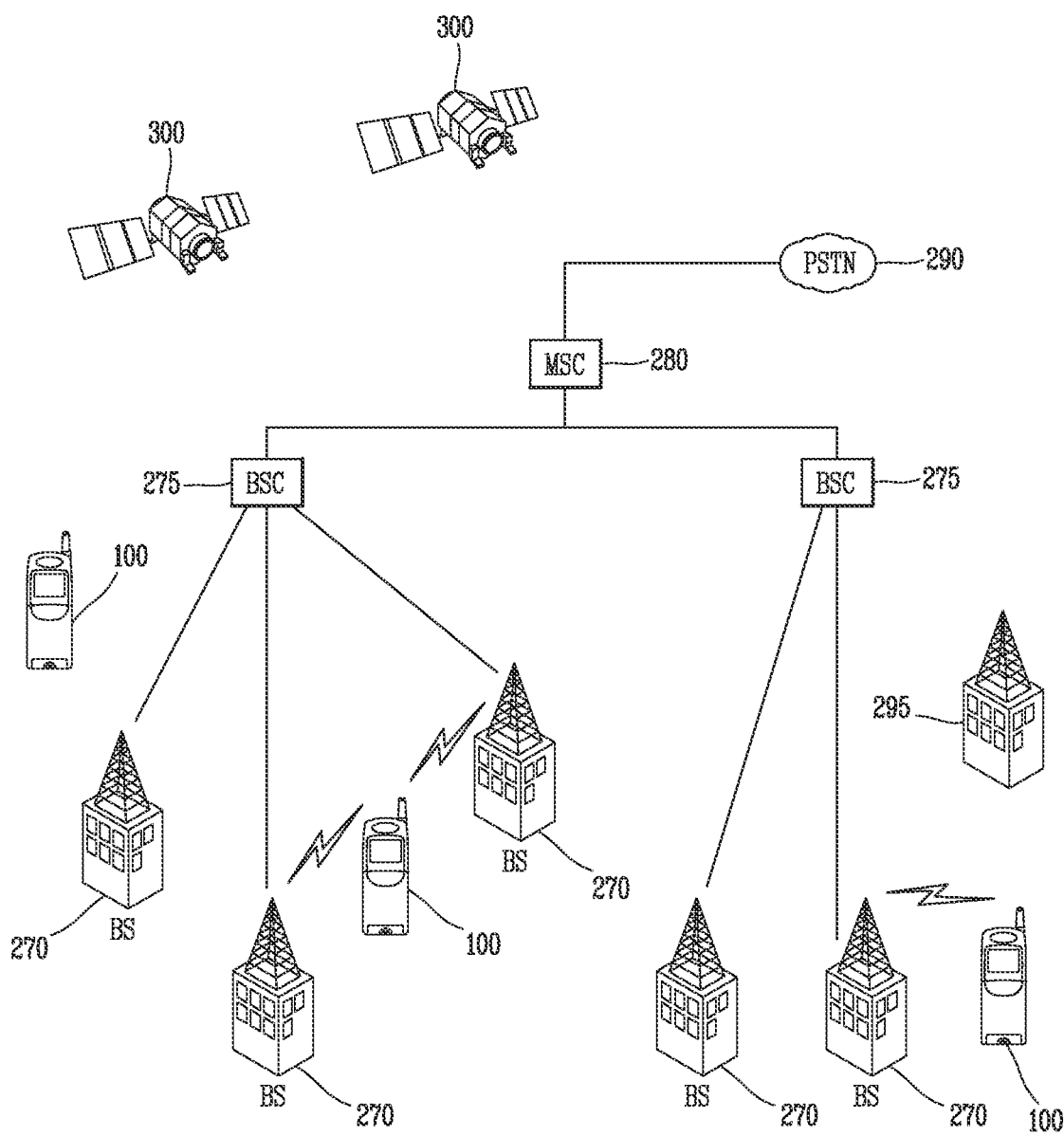
FIGS. 2A and 2B are diagrams illustrating a conceptional framework of a telecommunication system in which the mobile terminal according to the present invention operates.
Figure 2B:
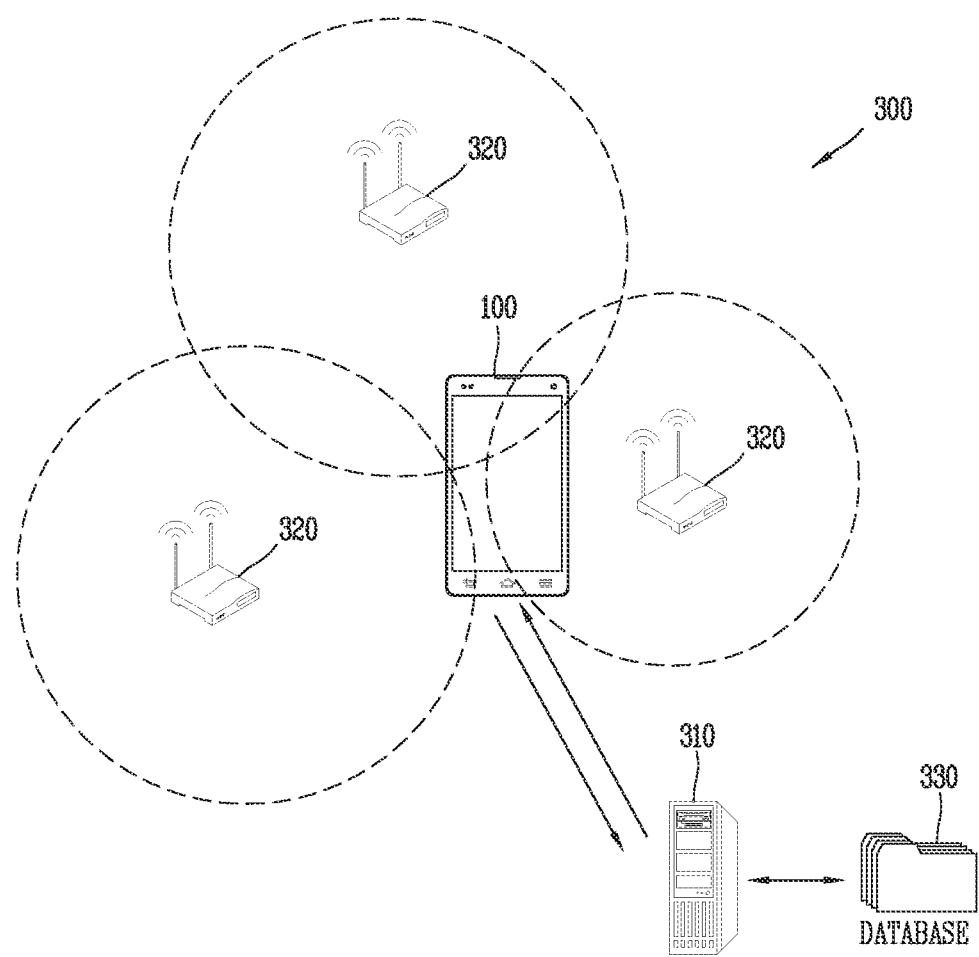

FIGS. 2a and 2b are conceptual views of a communication system operable with a mobile terminal in accordance with the present disclosure.

First, referring to FIG. 2a, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2a, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2a, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 2a further depicts several Global Positioning System (GPS) satellites 300. Such satellites 300 facilitate locating the position of at least one of plural mobile terminals 100. Two satellites are depicted in FIG. 2a, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2b.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2b, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, a mobile terminal according to an embodiment of the present disclosure as illustrated in FIG. 1 or a mobile terminal disposed with the constituent elements of the mobile terminal or the structure of a mobile terminal will be described.

Figure 3A:
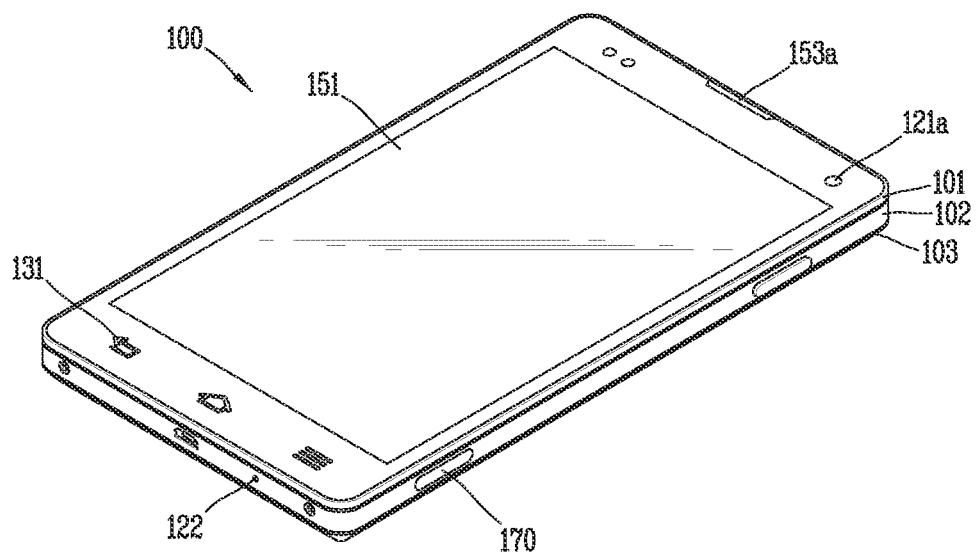
FIG. 3A is a perspective diagram illustrating the mobile terminal according to the embodiment of the present invention when viewed from the front.

FIG. 3a is a front perspective view illustrating an example of the mobile terminal 100 associated with the present disclosure.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3a, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. 3b), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
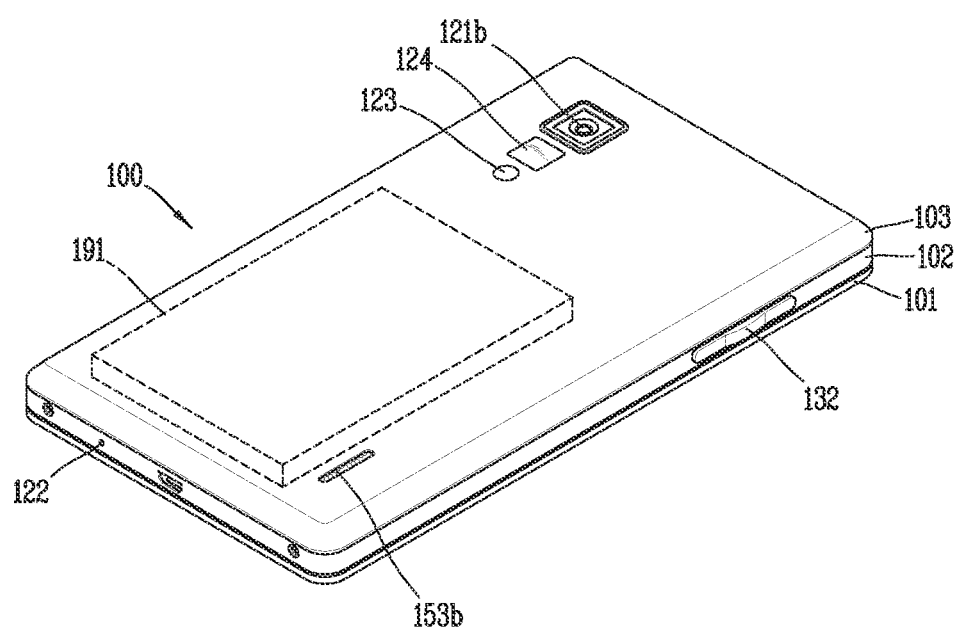
FIG. 3B is a perspective diagram illustrating the mobile terminal in FIG. 3A when viewed from the rear.

FIG. 3b is a rear perspective view illustrating mobile terminal 100 illustrated in FIG. 3a.

Referring to FIG. 3b, a second camera 121b may be additionally mounted at a rear surface of the terminal body, namely, the rear case 102. The second camera 121b has an image capturing direction, which is substantially opposite to the direction of the first camera unit 121a (refer to FIG. 3a), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3a) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

Thanks to these improvements, various applications have been introduced to the market. There has been an increasing demand for multitasking that allows the multiple applications to be concurrently executed.

In addition, there has been increasing concern over a screen division method for use in the mobile terminal, by which it is ensured during multitasking that processes of executing an application are concurrently performed.

Accordingly, the mobile terminal 100 capable of dividing a screen for user convenience and a method of controlling the mobile terminal are described below referring to the accompanying drawings.

The terms "first," and "second," in the following description are used to describe various constituent elements, but these are not limited to such terms. That is, the terms "first," and "second," are used to distinguish between the same constituent elements.

For example, a "first constituent element," if not beyond a scope of the invention, is named as a "second constituent element," and in the same manner, the "second constituent" is named as the "first constituent element.

Figure 4:
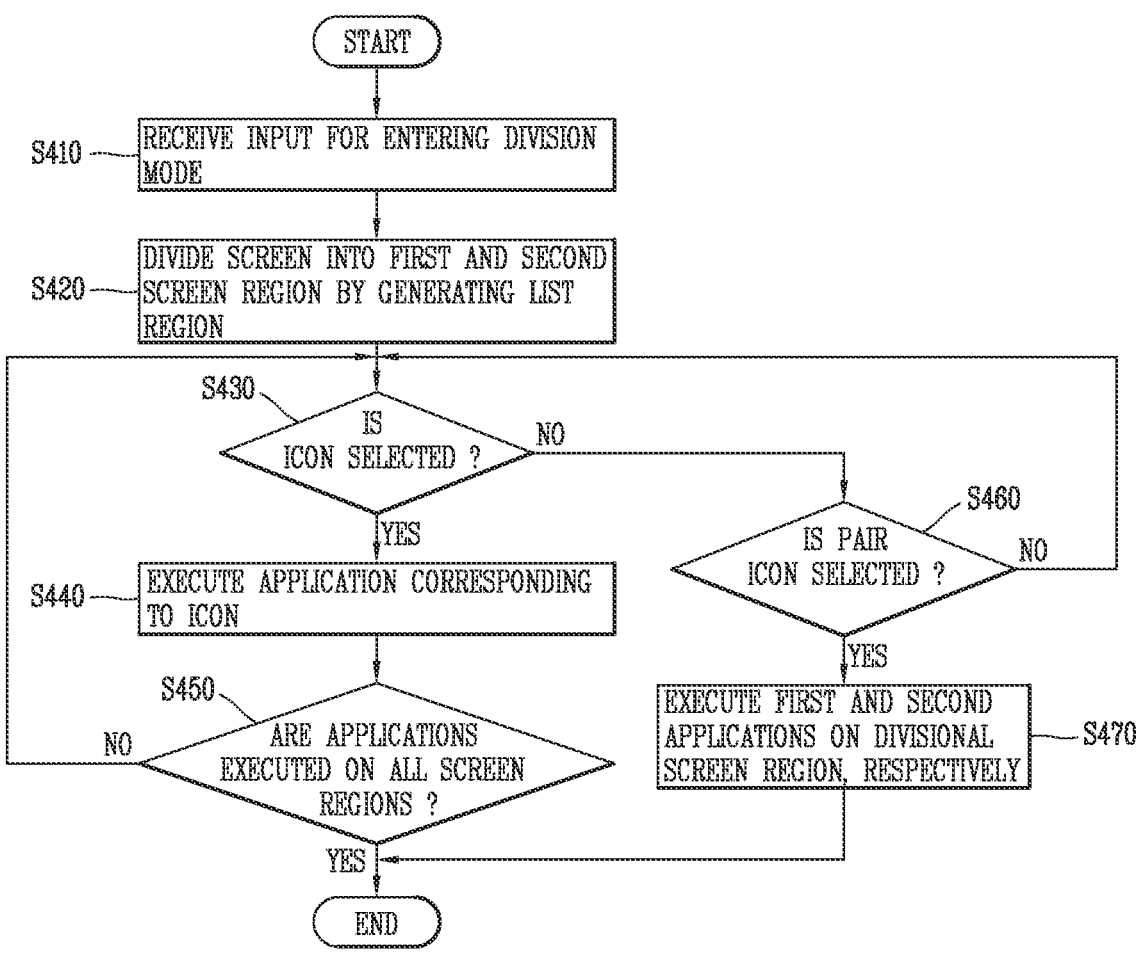
FIG. 4 is a flowchart for describing an embodiment of the mobile terminal according to the present invention.

FIG. 4 is a flowchart for describing the mobile terminal 100 (refer to FIG. 1) according to an embodiment of the present invention. The mobile terminal 100 includes the display unit 151 and the controller 180.

Referring to FIG. 4, first, Step S410 proceeds in which an input is received for entering a division mode in which the display unit 151 is divided into multiple divisional screen regions.

At this point, the division mode means a state in which the dividing of a screen 151 is in progress or a state in which the screen 151 is divided into multiple screen regions.

Specifically, the division mode is entered by pushing on or touching on a specific key or by applying a specific gesture. For example, the division mode is entered by applying a long push to a key BACKSPACE or by applying a gesture of crossing the screen 151 with a finger.

Subsequently, Step S420 proceeds in which a list region including an icon corresponding to the application is generated, and the display unit 151 is divided into first and second screen regions with a list region in between the first and second screen regions.

Subsequently, Step S430 proceeds in which it is determined whether the icon corresponding to the application is selected.

Accordingly, if the icon corresponding to the application is selected, Step S440 proceeds in which the application corresponding to the selected icon is executed on at least one of the first and second screen regions.

Specifically, the list region includes an indicator indicating on which screen region of the first and second screen regions which the application corresponding to the selected icon is executed. Such an indicator is displayed as being in the form of a specific icon, a mark, an arrow and others. Accordingly, the application corresponding to the selected icon is executed on the screen region indicated by the indicator on the list region.

Next, Step S450 proceeds in which it is determined whether the application is executed on all the screen regions.

Accordingly If the application is executed on the screen region, the division mode is ended. If the screen region on which the application is not executed is present, returning to the Step S430 takes place in which it is determined whether or not the icon is selected.

If the icon corresponding to the application is not selected in Step S430 described above, Step S460 proceeds in which it is determined whether a pair icon is selected on the list region.

Specifically, the pair icon is defined as an icon that includes a first icon corresponding to a first application and a second icon corresponding to a second application.

Accordingly, if the pair icon is selected, Step S470 proceeds in which according to positions of the first and second icons arranged on the selected pair icon, the first and second applications are executed on one of the first and second screen regions.

If the pair icon is not selected, returning to the Step S430 takes place in which it is determined whether or not the icon is selected.

Figure 5A:
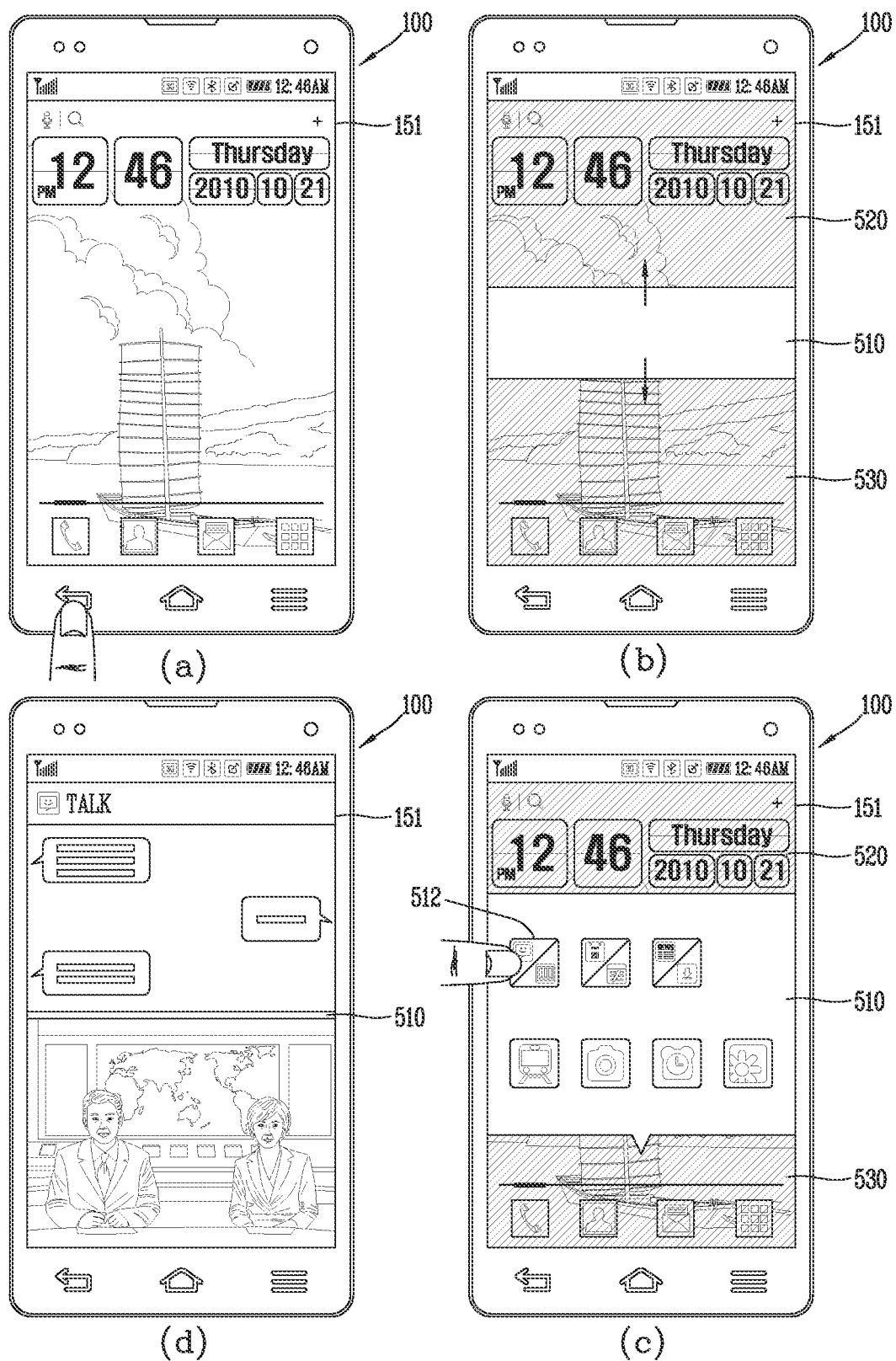
FIGS. 5A(a) to 5E(d) are diagrams illustrating an embodiment of a user interface in a division mode.

FIGS. 5A(a) to 5E(d) are diagrams illustrating an embodiment of a user interface in the division mode.

FIGS. 5A(a) to 5A(d) are diagram illustrating an embodiment of the user interface in which the pair icon is selected when entering the division mode on the home screen.

Referring to FIG. 5A(a), the user can enter the division mode on the home screen by applying the long push to the key BACKSPACE.

Referring to FIG. 5A(b), when the input is received for entering the division mode, a list region 510 is generated in such a manner that the list region 510 spreads out upward and downward from the center of the screen 151 in the upward and downward directions of the screen 151. In addition, the screen 151 is divided into first and second screen regions 520 and 530 with the list region 510 in between the first and second screen regions 520 and 530.

At this point a position in which the list region 510 is generated is not limited to the center of the display unit 151 and can be generated on various arbitrary positions on the display unit 151. That is, sizes of the first and second screen regions 520 and 530 are adjusted according to the position in which the list region 510 is generated.

Then, when an animation effect is applied in the process of spreading out the list region 510, this leads to natural changes in the screen 151.

According to an embodiment, the home screen is output in a dimmed manner and the list region 510 gradually spreads output upward and downward in such a manner to overlap such a home screen.

Referring FIG. 5A(c), the pair icon, which includes the icon corresponding to the application and the icon corresponding to the multiple applications, is output to the list region 510.

Specifically, by touching on a pair icon 512, the user can select the pair icon 512 that includes the first icon corresponding to the first application and the second icon corresponding to the second application.

Referring to FIG. 5A(d), the list region 510 is gradually decreased in size and thus is transformed into a bar shape. At this point, the list region 510 is gradually decreased in size, which is opposite to the process in which the list region 510 is generated as illustrated in FIG. 5A(a).

Then, the first application is executed on the first screen region 520, and the second application is executed on the second screen region 530. At this point, the screen regions on which the first and second applications are executed are determined according to positions on the pair icon 512, in which the first and second icons are arranged, respectively.

FIGS. 5B(a) to 5B(d) are diagrams illustrating an embodiment of an user interface in which the pair icon is selected when entering the division mode on the home screen in a rotated state of the mobile terminal 100.

A bar indicating a state of the mobile terminal 100, the application being executed, and the icon and the pair icon included in the list region 510 are displayed in a rotated state, compared to the case of FIGS. 5A(a) to 5B(d). Then, the list region 510 is generated in such a manner as to spread out in the leftward and rightward directions of the screen 151. That is, a basic division method is the same as the one illustrated in FIG. 5A(a) to 5A(d).

A user interface to be described below referring the accompanying drawings, as illustrated, FIGS. 5B(a) to 5B(d), is executed also in the rotated state of the mobile terminal 100.

Figure 5C:
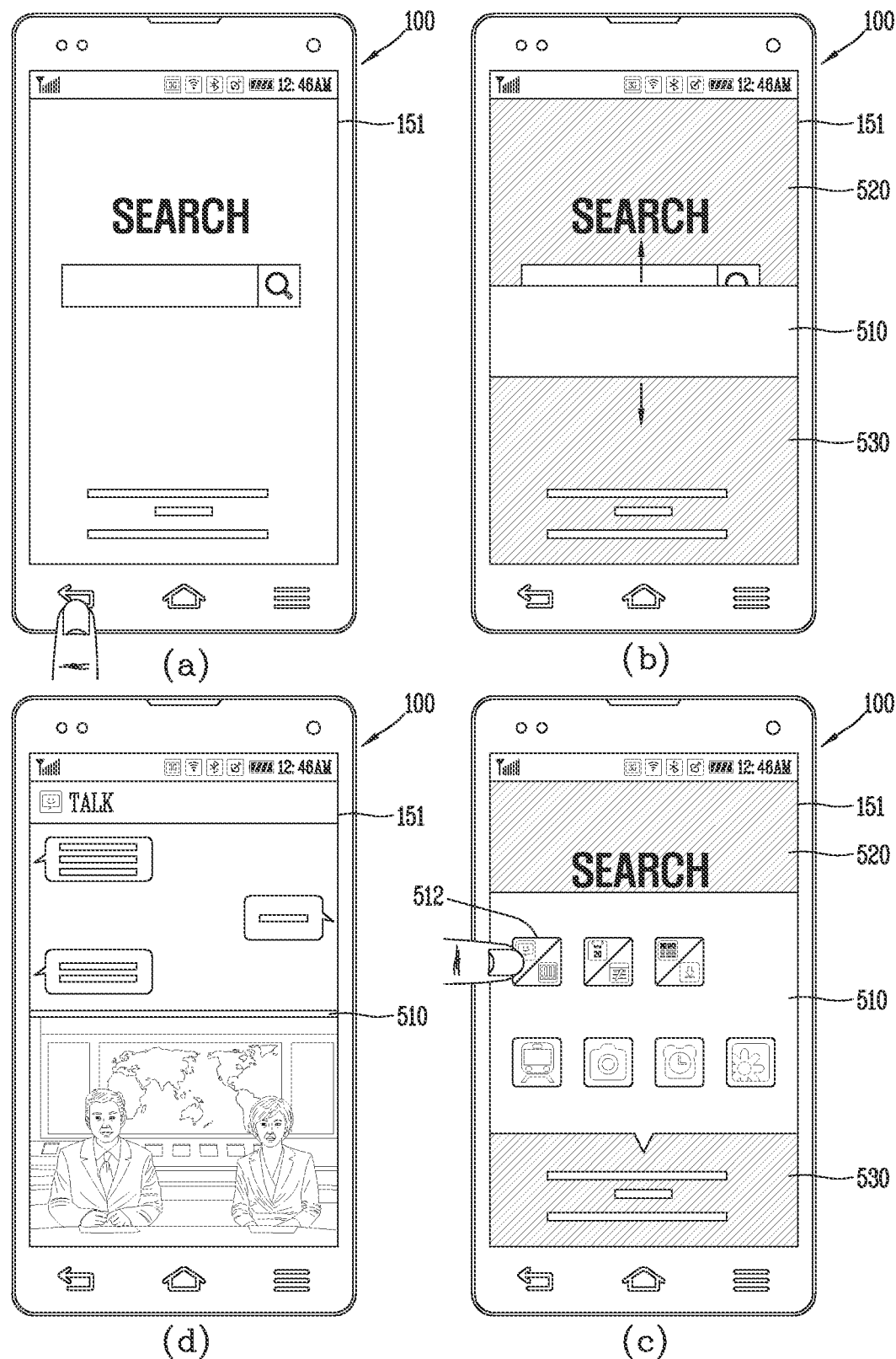

FIGS. 5C(a) to 5C(d) are diagrams illustrating an embodiment of a user interface in which the pair icon is selected when entering the division mode while executing the application.

Referring to FIG. 5C(a), the user can enter the division mode by applying the long push to the key BACKSPACE while executing the application.

Referring to FIG. 5C(b), the screen 151 is divided into the first and second screen regions and 520 and 530, with the list region 510 generated in such a manner as to spread out in the upward and downward directions of the screen 151 in between the first and second screen regions and 520 and 530. At this point, the application being executed is output to a lower layer of the list region 510 with an effect of a dimmed image.

Referring to FIG. 5C(c), by touching on the pair icon 512, the user can select the pair icon 512 that includes the first icon corresponding to the first application and the second icon corresponding to the second application.

Referring to FIG. 5C(d), the list region 510 is gradually decreased in size and thus is transformed into the bar shape. Then, the first application is executed on the first screen region 520, and the second application is executed on the second screen region 530.

That is, referring to FIGS. 5A(a) to 5C(d), when the user enters the division mode and selects the pair icon, regardless of whether or not the application being executed is present, the multiple applications corresponding to the pair icon are executed on the divisional screen regions, respectively.

On the other hand, an icon other than the pair icon may be selected in the division mode.

Figure 5D:
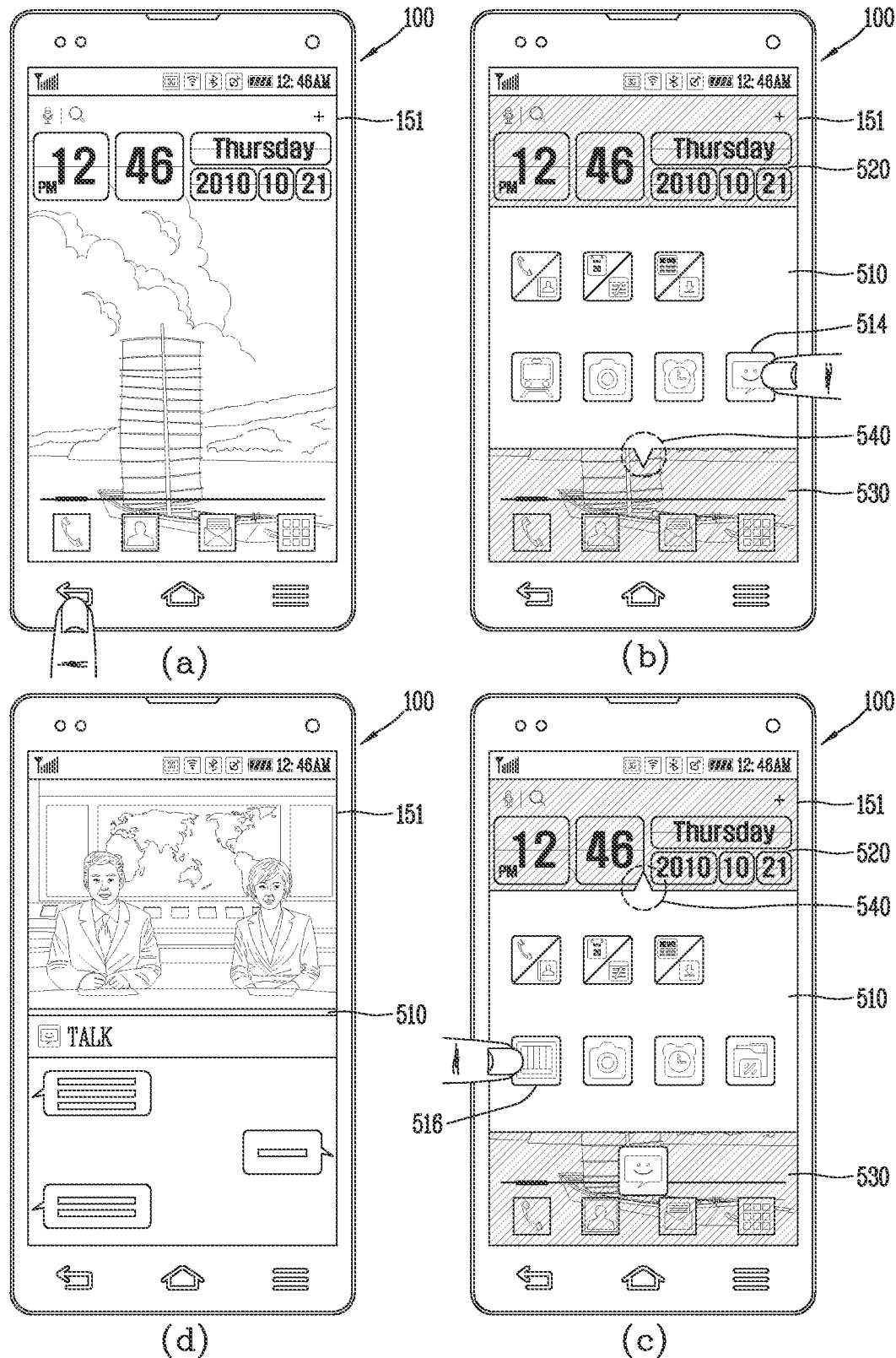

FIGS. 5D(a) to 5D(d) are diagrams illustrating an embodiment of a user interface in which the icon is selected when entering the division mode on the home screen.

Referring to FIGS. 5D(a) and 5D(b), the user can enter the division mode by applying the long push to the key BACKSPACE while executing the application. Accordingly, the list region 510, and the first and second screen regions 520 and 530 are generated.

In addition, the home screen is output to the lower layer of the list region 510 with the effect of the dimmed image, and an indicator 540 the list region 510 is set in such a manner as to face the second screen region 530.

At this point, the user can select an icon 514 corresponding to a messenger application by touching on the icon 514. In addition, the icon 514 can be selected by dragging the icon 514 to the screen region on which the application indicated by the icon 514 is to be executed.

Referring to FIG. 5D(c), the icon corresponding to the messenger application is output to the second screen region 530. Subsequently, a direction that the indicator 540 faces is changed to a direction toward the first screen region 520 on which the application being executed is absent.

At this point, the user can select an icon 516 corresponding to a moving image application by touching on the icon 516.

Referring to FIG. 5D(d), the list region 510 is transformed into the bar shape, the moving image application is executed on the first screen region 520, and the messenger application is executed on the second screen region 530.

As described above, the indicator on the list region is set in such a manner as to face the screen region on which the application being executed is absent. At this point, the user can switch the direction that the indicator faces by touching on or dragging the indicator.

Figure 5E:
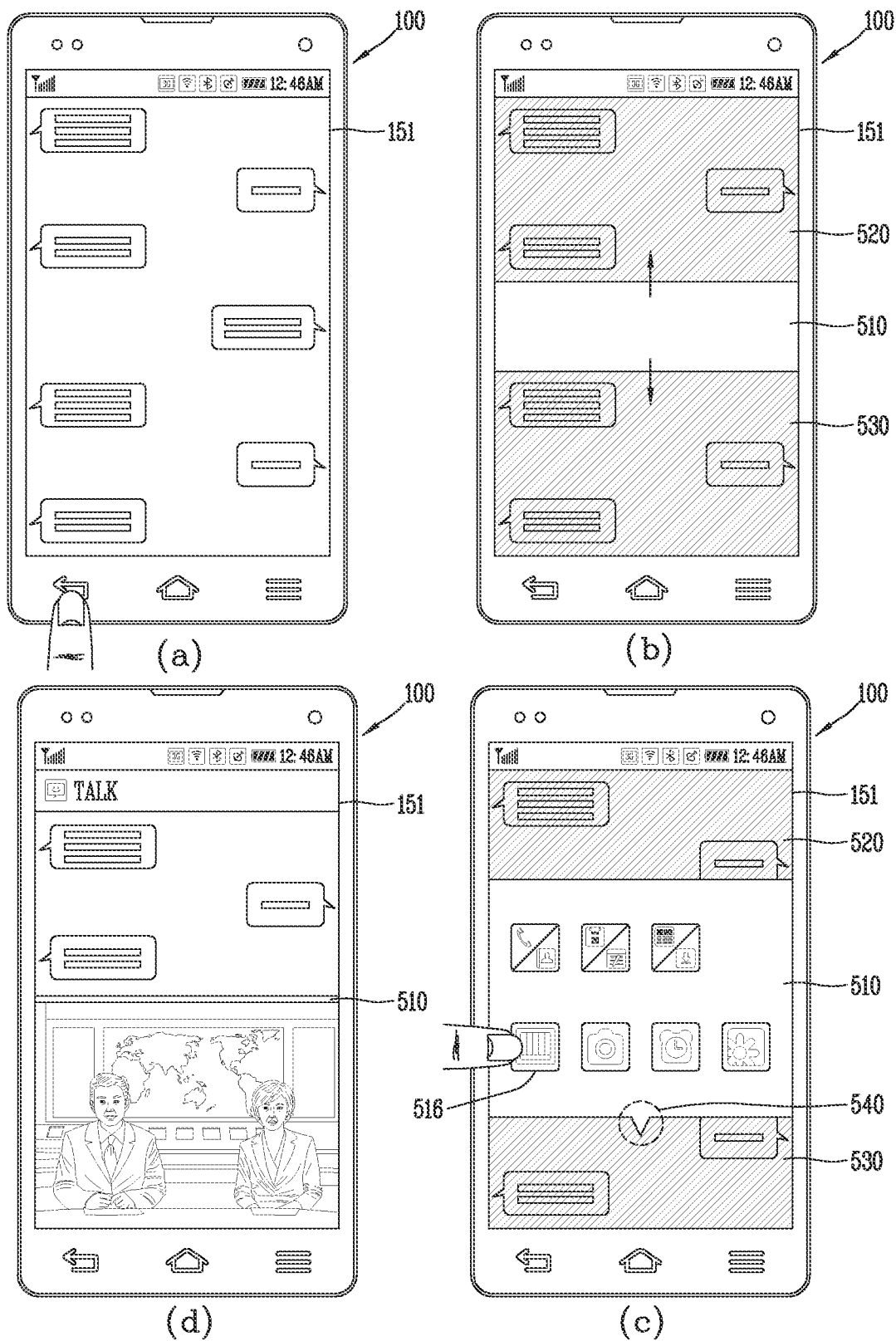

FIGS. 5E(a) to 5E(d) are diagrams illustrating an embodiment of a user interface in which the icon is selected when entering the division mode while executing the application.

Referring to FIGS. 5E(a) and 5E(b), the user can enter the division mode by applying the long push to the key BACKSPACE while executing the messenger application. Accordingly, the list region 510, and the first and second screen regions 520 and 530 are generated.

Referring FIG. 5E(c), the messenger application being executed is output to the lower layer of the list region 510 with the effect of the dimmed image, and the indicator 540 is set in such a manner as to face the second screen region 530.

At this point, the user can select the icon 516 corresponding to the moving image application by touching on the icon 516.

Referring to FIG. 5E(d), the list region 510 is transformed into the bar shape, the messenger image application is executed on the first screen region 520, and the moving image application is executed on the second screen region 530.

According to another embodiment, the user can select the icon when entering the division mode and then select the pair icon. As a result, regardless of the earlier-selected icon, the applications corresponding to the pair icon are executed on the divisional screen region, respectively.

On the other hand, as described above, according to the positions of the first and second icons that are arranged on the fair icon, the applications corresponding to the first and second icons, respectively, are executed on one of the first and second screen regions.

Figure 6A:
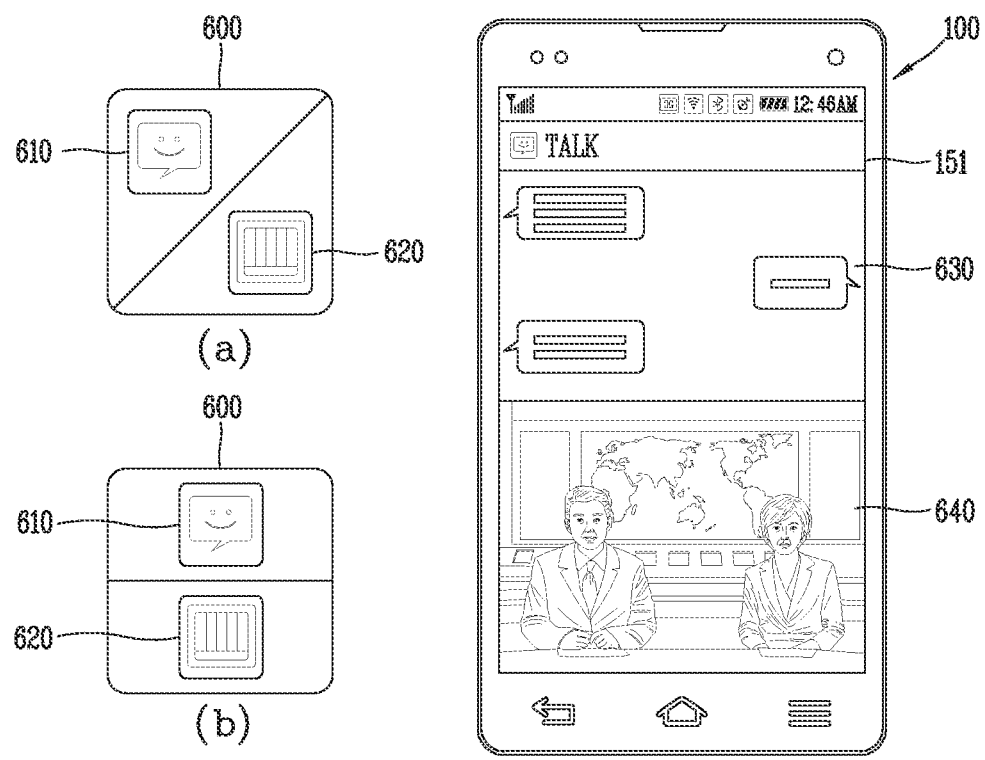
FIGS. 6A(a) to 6C are diagrams illustrating an embodiment in which applications are executed on divisional screen regions according to arrangement of icons included in a pair icon.

FIGS. 6A(a) to 6C are diagrams illustrating an embodiment in which the applications are executed on the divisional screen regions according to arrangement of the icons included in the pair icon.

In FIGS. 6A(a) to 6C, a pair 600 includes first and second icons 610 and 620. In addition, the first application corresponds to the first icon 610 and the second application corresponds to the second icon 620.

Referring to FIG. 6A(a), the first icon 610 is arranged on the upper left portion of the pair 600, and the second icon 620 is arranged on the lower right portion.

Referring to FIG. 6A(b), the first icon 610 is arranged on the upper middle portion of the pair 600, and the second icon 620 is arranged on the lower middle portion.

Accordingly, when the user selects the pair 600, the first application is executed on the first screen region 630, and the second application is executed on the second screen region 640.

Figure 6B:
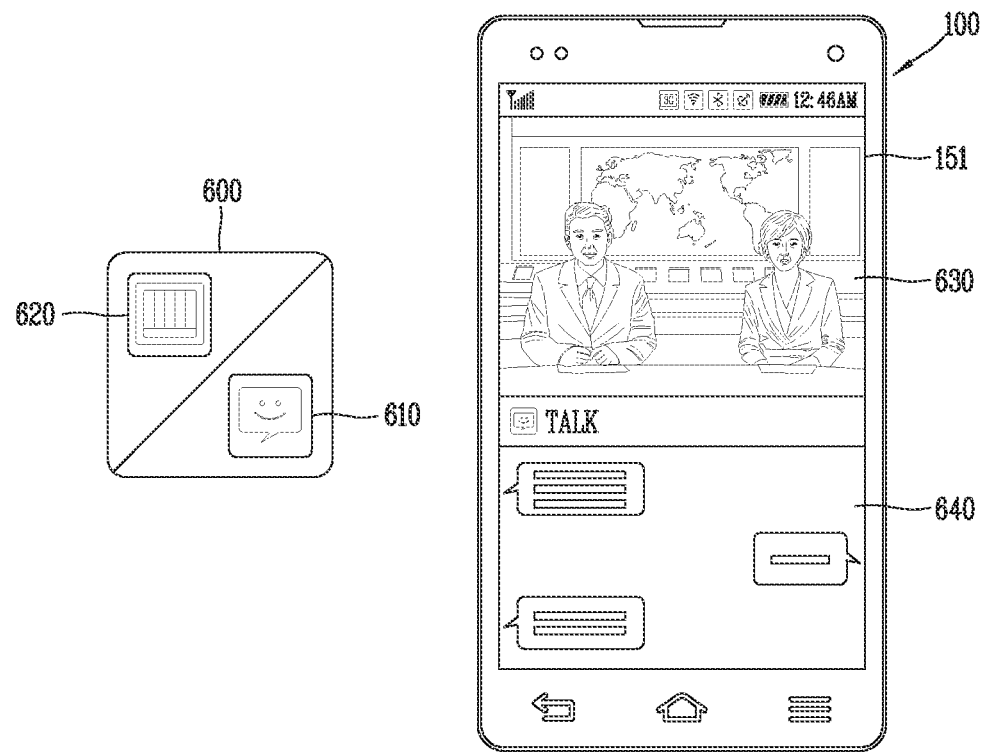

Referring to FIG. 6B, the first icon 610 is arranged on the lower right portion of the pair 600, and the second icon 620 is arranged on the upper left portion.

Accordingly, when the user selects the pair 600, the second application is executed on the first screen region 630, and the first application is executed on the second screen region 640.

Figure 6C:
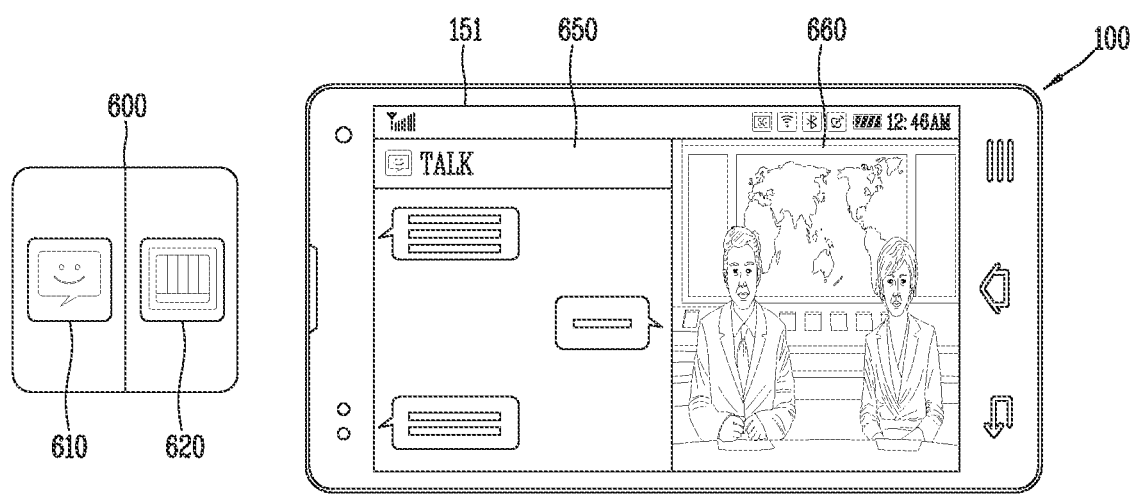

Referring to FIG. 6C, the first icon 610 is arranged on the middle left portion of the pair icon 600 and the second icon 620 is arranged on the middle right portion.

Accordingly, when the user selects the pair 600, the screen 151 is divided like in the rotated state of the mobile terminal 100. Then, the first application is executed on the first screen region 650, and the second application is executed on the second screen region 660.

On the other hand, the user can set the screen region on which the first and second applications are to be executed, by changing the positions of the first and second icons 610 and 620 included in the pair 600.

According to an embodiment, in FIG. 6A(a), the first and second icons 610 and 620 can be concurrently touched on and then be moved clockwise. Accordingly, the first and second icons 610 and 620 can be arranged as illustrated in FIG. 6B, and the screen region on which the first and second applications are executed can be switched.

According to another embodiment, in FIG. 6B, the first icon 610 can be dragged to the upper left portion of the pair icon 600. Subsequently, the second icon 620 can be dragged to the lower right portion of the pair 600. Accordingly, the first and second icons 610 and 620 can be arranged as illustrated in FIG. 6A(a), and the screen region on which the first and second applications are executed can be switched.

On the other hand, the pair icon and the icon that are included in the list region may be selected using various methods.

Figure 7:
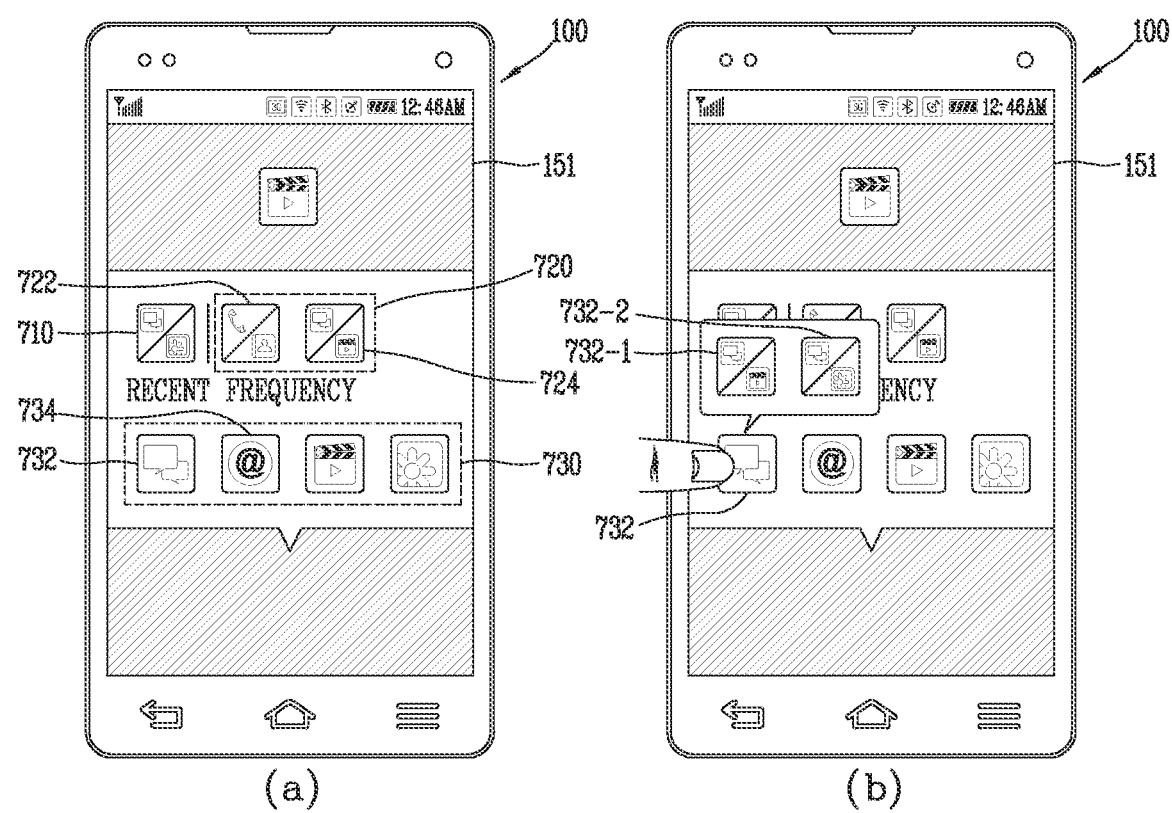
FIGS. 7A and 7B are diagrams, each illustrating an embodiment of an interface of the pair icon and the icon that are included in a list region.

FIGS. 7A and 7B are diagrams, each illustrating an embodiment of an interface of the pair icon and the icon that are included in the list region.

Referring to FIG. 7A, a pair icon 710 is output to the list region. The pair icon 710 includes icons corresponding to the first and second applications that are executed on the first screen region immediately before entering the division mode, respectively.

Specifically, if the messenger application is executed on the first screen region immediately before entering the division mode and a photo album application is executed on the second screen region, the icon 710 is output that includes the icon corresponding to the messenger application and the icon corresponding to the photo album application.

According to an embodiment, a pair icon 720 is output to the list region. The pair icon 720 includes the icons corresponding to the multiple applications, respectively, which are selected according to the number of times that the execution occurs on each divisional screen region together.

Specifically, the pair icon is arranged with respect to a pair of applications that is executed on each divisional screen region, in increasing order of the number of times that the pair of applications is executed.

For example, the number of times that a telephone application and an address book application are executed together is assumed to be greater than the number of times that the messenger application and the moving image application are executed together.

Accordingly, a pair icon 722 including the icons corresponding to the telephone application and the address book application, respectively is arranged with higher priority than a pair icon 724 including the icons corresponding to the messenger application and the moving image application, respectively.

According to another embodiment, an icon 730 is output to the list region. The icon 730 corresponds to the application that is selected according to the number of times that the execution occurs on at least one of the first and second screen regions.

Specifically, if the messenger application is more frequently executed on the divisional screen region than an Internet application, an icon 732 corresponding to the messenger application is arranged with high priority than an icon 734 corresponding to the Internet application.

According to another embodiment, the icon 730 is output to the list region. The icon 730 corresponds to the application that is selected according to the number of times that the execution occurs on each divisional screen region, together with the execution of the application to be executed on the first screen region.

Specifically, the icon corresponding to the moving image application to be executed on the first screen region is output to the first screen region. Specifically, if the messenger application is more frequently executed together with the moving image application than the Internet application, the icon 732 corresponding to the messenger application is arranged with higher priority than the icon 734 corresponding to the Internet application.

On the other hand, when a first icon is selected that corresponds to the application included in the list region, the application is selected according to the number of times that the execution occurs on each divisional screen region occurs together with the execution of the application corresponding to a first icon. Accordingly, the pair icon is output that includes the icon corresponding to the selected application and the first icon.

Referring to FIG. 7B, when the user selects the icon 732 corresponding to the messenger application by applying a long touch or a short touch to the icon 732, the moving image application that is the most frequently executed together with the messenger application and the photo album application that is the second most frequently executed together with the messenger application are selected.

Accordingly, a pair icon 732-1 including the icons corresponding to the messenger application and the moving image application, respectively, is arranged with higher priority than a pair icon 732-2 including the icons corresponding to the messenger application and the photo album application, respectively. Thus, the pair icon 732-1 is output with higher priority than the pair icon 732-2.

On the other hand, a page is output to the display unit 151. On the page is explained the reason that the pair icon and the icon that are output in this manner.

FIGS. 8A to 8D are diagrams illustrating an embodiment in which the page explains the reason that the pair icon and the icon, output to the list region, are selected.

Figure 8:
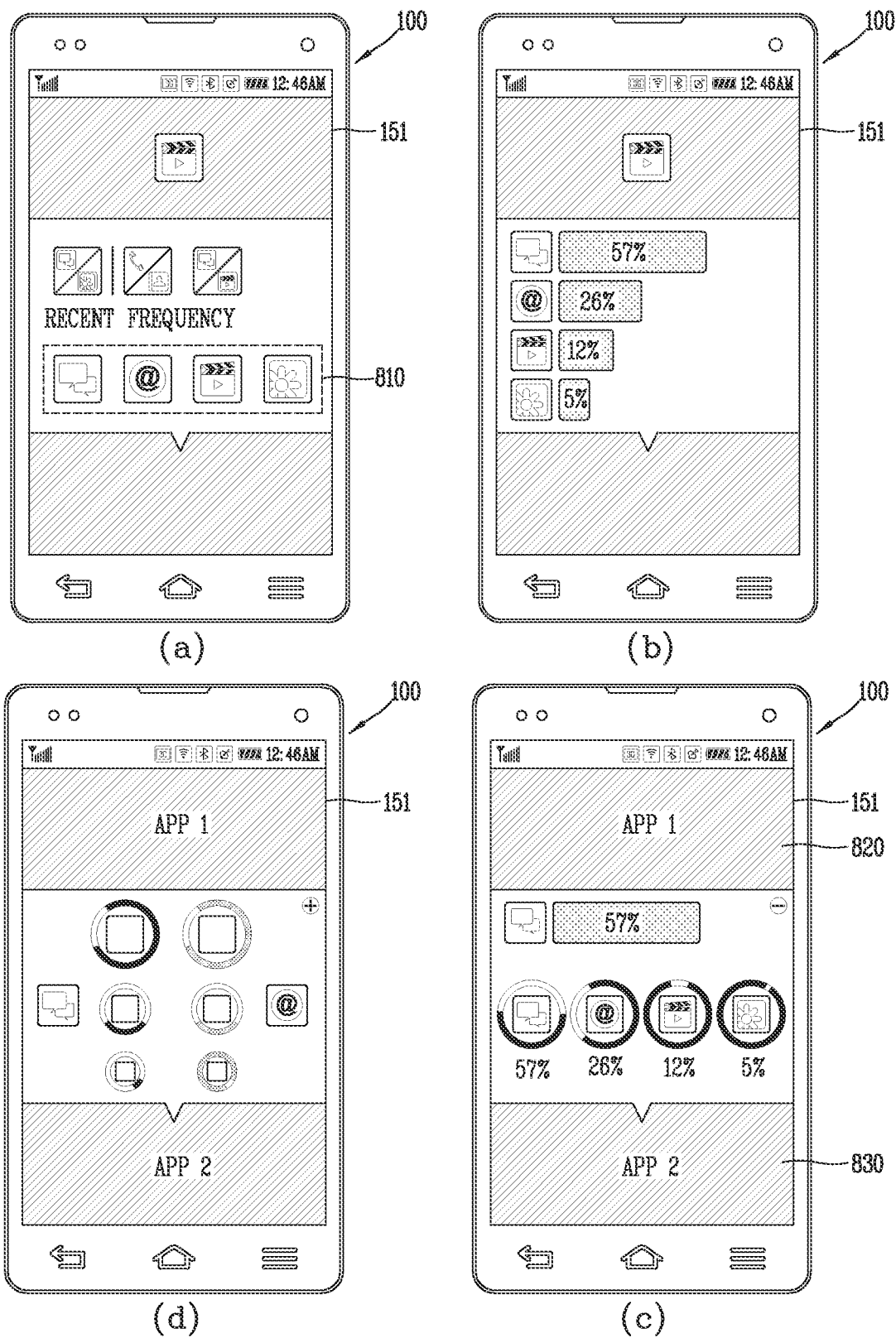
FIGS. 8A to 8D are diagrams illustrating an embodiment in which a page explains the reason that the pair icon and the icon, output to the list region, are selected.

Referring to FIG. 8A, icons 810 are output to the list region, in increasing order of the number of times that the execution occurs.

At this point, if the user pushes on a specific key, the pages as illustrated in FIGS. 8B to 8D are output.

Referring to FIG. 8B, the screen is output on which the number of times that the application corresponding to each of the icons 810, output to the list region, is executed, is displayed as a graph.

Referring to FIG. 8C, the screen is output on which the number of times that the execution occurs, along with the execution of the first application being executed on the first screen region 820 is displayed as a diagram.

Referring to FIG. 8D, the number of times that the execution occurs together with the execution of the first application being executed on the first screen region 820 and the number of times that the execution occurs together with the execution of the second application being executed on the second screen region 830 are output as diagrams.

Accordingly, the user can understand the reason that the pair icon and the icon that are output to the list region are selected.

On the other hand, an application including information relating to the application being executed on the first screen region is output to the second screen region.

In addition, the application that is selected according to the number of times that the execution occurs on each divisional screen region, together with the execution of the application being executed on the first screen region, is output to the second screen region.

Figure 9:
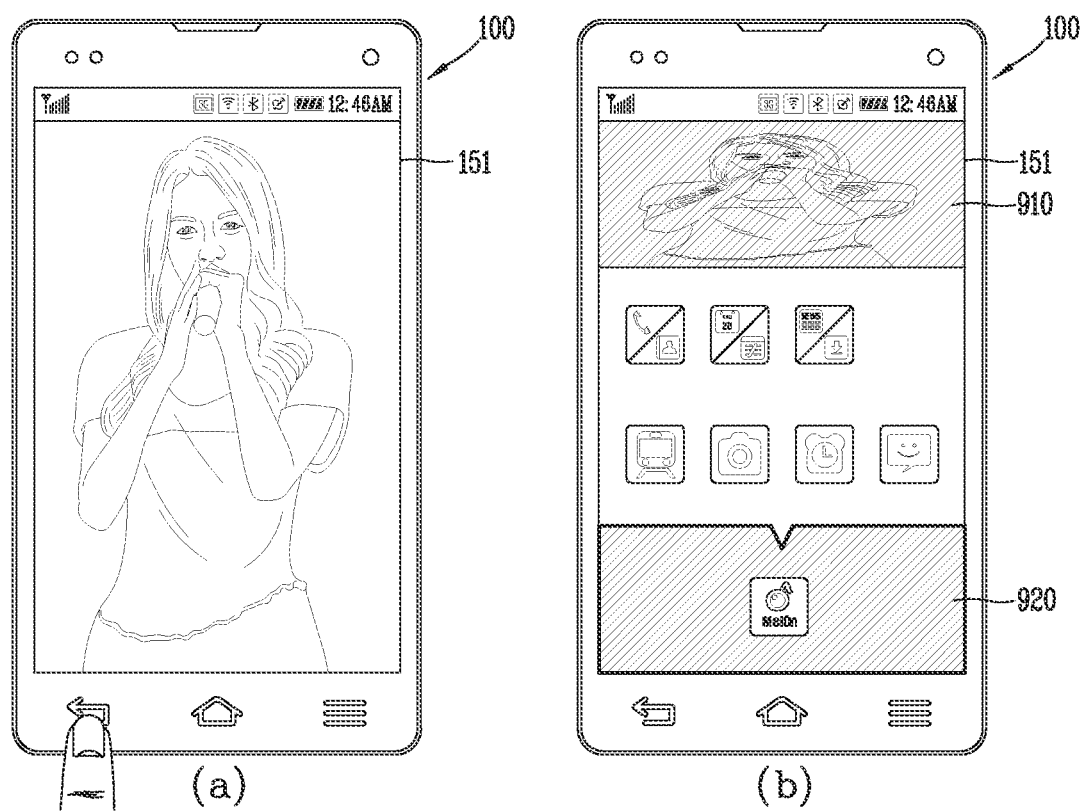
FIGS. 9A and 9B are diagrams illustrating an embodiment in which an application to be executed on the divisional screen region is selected according to an application being executed.
Figure 10:
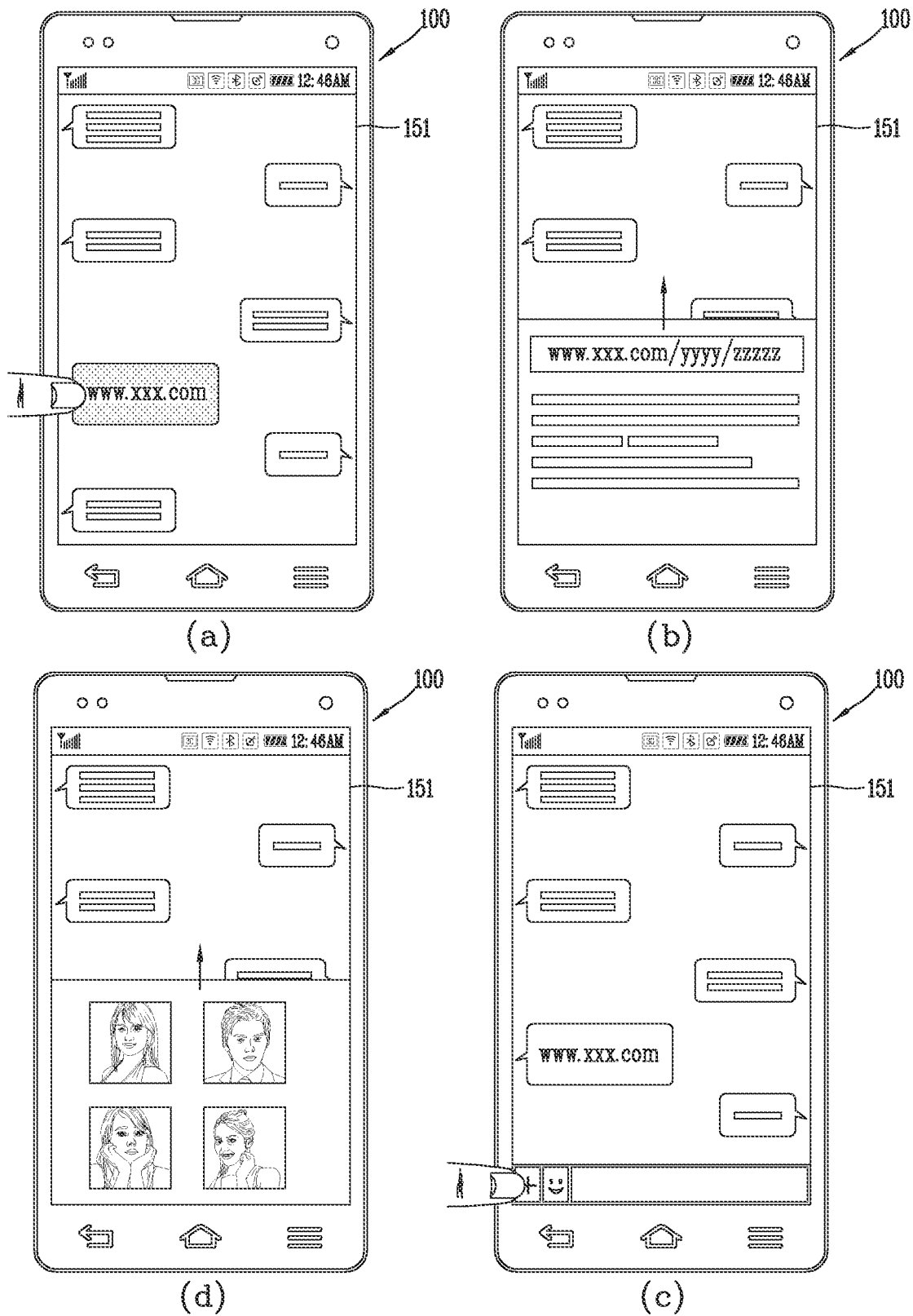
FIGS. 10 to 12 are diagrams illustrating an embodiment of a user interface in which the division mode is automatically entered.
Figure 11:
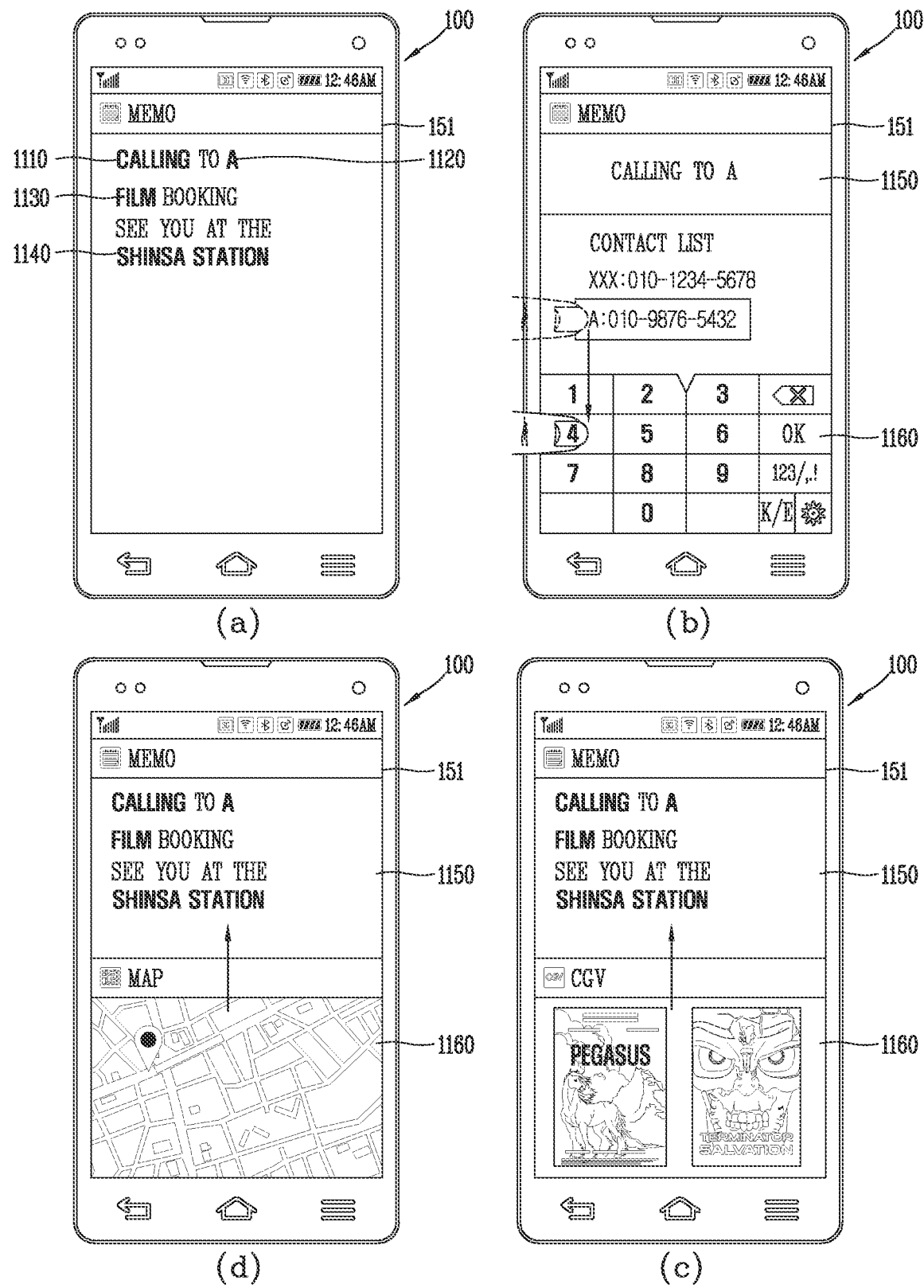
Figure 12:
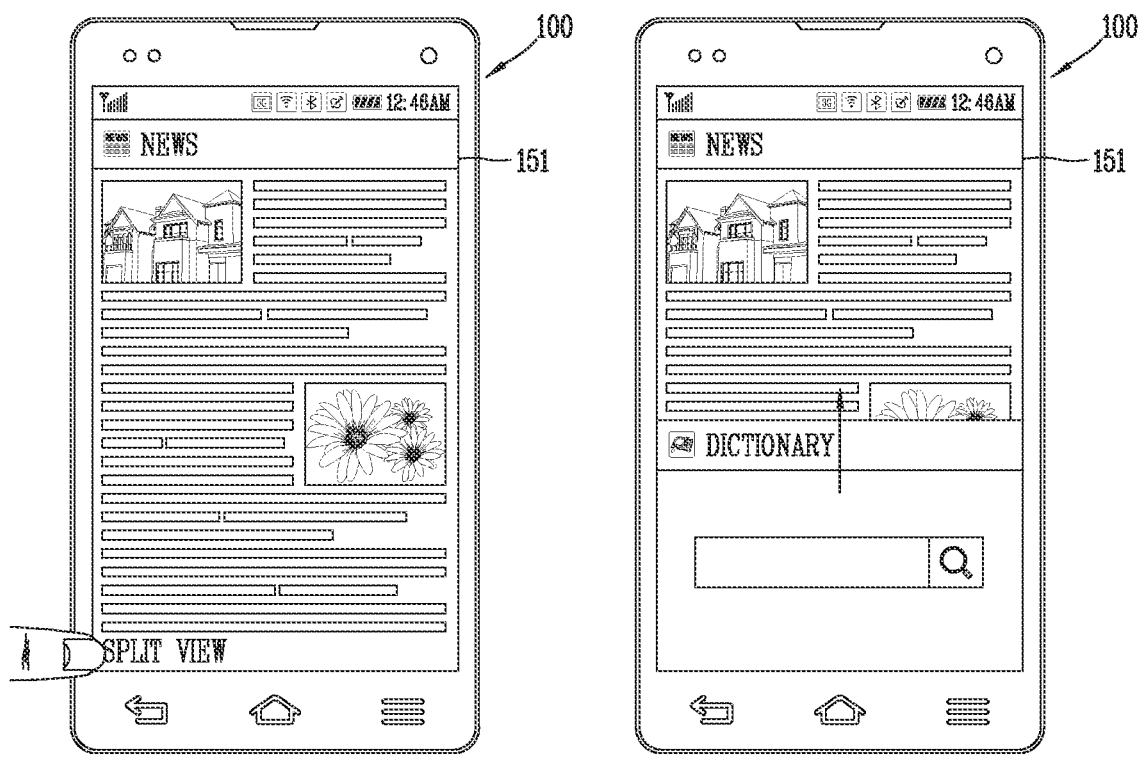

FIGS. 9A and 9B are diagrams illustrating an embodiment in which the application to be executed on the divisional screen region is selected according to the application being executed.

Referring to FIG. 9A, the division mode is entered while executing the first application on the entire screen 151.

Referring to FIG. 9B, the first application being executed on the entire screen 151 is output to a first screen region 910, and the second application including the information relating to the first application is output to a second screen region 920.

Specifically, if the first application is the moving image application, that is, a music video, the controller 180 produces the information relating to the first application, using a technique of identifying a song or broadcast content that is being reproduced or of identifying a singer's face.

Subsequently, the second information including such information is selected and is output to the second screen region 920. For example, at least one of the applications that include the song, sang in the moving image on the first screen region 910, information on the album including that song, news items relating to the singer, and others is output to the second screen region 920.

According to another embodiment, if many singers' faces are output to the first screen region 910, the user can select the face of one singer. As a result, the application including the information relating to the selected face of the singer is output to the second screen region 920.

According to another embodiment, if a song is reproduced on the first screen region 910, the application including the information relating to the corresponding song or the application through which the corresponding song can be downloaded is output to the second screen region 920.

According to another embodiment, if a broadcast application is being executed on the first screen region 910, the next broadcast of the broadcast application, other broadcasts in the same time period, and others are output to the second screen region 920.

According to another embodiment, a default application is set to prevent a state where the recommended application is absent on the second screen region 920.

On the other hand, when a predetermined command is input while a predetermined application is executed on the display unit 151, the display unit 151 is divided. Then, the predetermined application and the application that is predetermined corresponding to the control command are executed on the divisional screen regions, respectively.

FIGS. 10A to 12 are diagrams illustrating an embodiment of a user interface in which the division mode is automatically entered.

Referring FIG. 10A, the user can select a linked address on a conversation window while executing the messenger application on the entire screen 151, by clicking on the linked address.

Referring to FIG. 10B, the screen 151 is automatically divided according to a control command, the clicking-on of the linked address. That is, the screen 151 is divided without applying the long push to the key BACKSPACE.

According to an embodiment, a new window is output from below the screen 151 with the animation effect. In addition, the application that corresponds to the linked address is output to the new window that is output.

Referring to FIG. 10C, the user can touch on a file attachment button while executing the messenger application on the entire screen 151.

Referring to FIG. 10D, as illustrated in FIG. 10B, the screen is automatically divided according to the control command, the touching-on of the file attachment button, and the photo album application is output to the new window that is output.

According to another embodiment, referring to FIG. 11A, text information, such as "TO MAKE A TELEPHONE CALL TO" 1110, "A" (a person's name) 1120, "MOVIE" 1130, and "SINSA STATION" 1140, are included in a memo application that is being executed on the entire screen 151. At this point, the user can touch the text information to input the control command that is selected.

Referring to FIG. 11B, when the user touches on the text information, "TO MAKE A TELEPHONE CALL TO" 1110, the screen is divided like in the case of the entering of the division mode, describe above. Accordingly, the memo application is executed, as is, on a first screen region 1150, and an application through which a telephone call is made is executed on a second screen region 1160.

Then, a contact information application is output to the region (the list region) that is output between the first and second screen regions 1150 and 1160. As a result, the user can make a telephone call by touching on or dragging the contact information.

According to another embodiment, when the person's name "A" 1120 included in the memo is touched on, a telephone call application is executed.

Referring to FIG. 11C, when the user touches on the text information "MOVIE" 1130, the screen 151 is automatically divided, and an application through which a movie ticket can be reserved is output to a new screen region 1160.

Referring to FIG. 11D, when the user touches on the text information "SINSA STATION" 1140, the screen 151 is automatically divided, and an application through which the way to the destination is searched for is output to the new screen region 1160.

At this point, the location of SINSA STATION and the location of the user are identified and are automatically output to a map search application.

To execute the embodiment in FIGS. 11A to 11D, the controller 180 uses a text-based search tool.

According to another embodiment, the user can select an English word by applying the long touch to the English word while reading news items after executing a news application on the entire screen 151.

At this point, if the user selects the English word, it is determined that the English word is frequently looked up in an English dictionary application. Accordingly, the screen 151 is automatically divided, and the English dictionary application is output to the divisional screen region.

According to another embodiment, if the user selects a Korean word, it is determined that web search or memo creation is frequently made, and the corresponding application is output to the divisional screen region.

According to another embodiment, a recommended or shared application is set in such a manner as to vary according to an image type selected by the user. That is, if the user selects a food image by applying the long touch to the food image, for example, a method of cooking the corresponding food is output to the divisional screen region. That is, if the user selects a portrait by applying the long touch to the portrait, for example, a profile of the corresponding person is output to the divisional screen region.

On the other hand, when a first object included in the application being executed on the first screen region is selected, the first object is transferred to the application being executed on the second screen region. Subsequently, the application being executed on the second screen region performs predetermined function that is in advance, using the first object.

Figure 13:
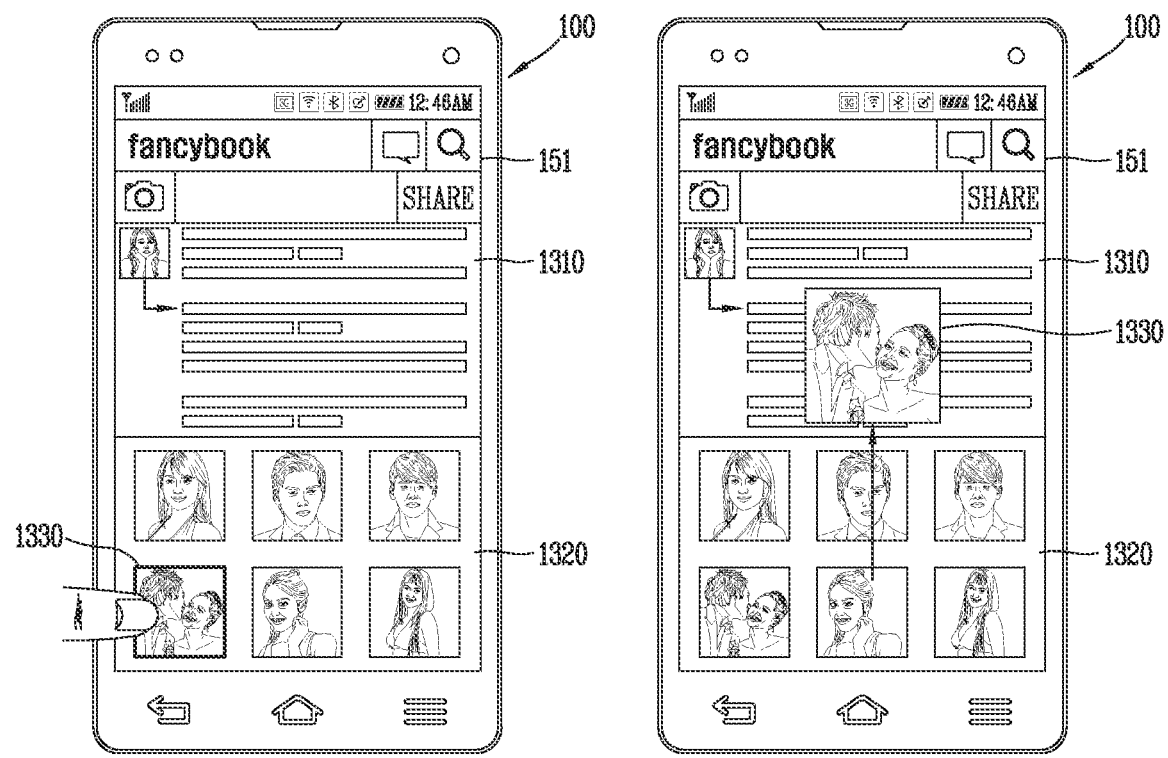
FIG. 13 is a diagram illustrating an embodiment of a user interface that information is mutually exchanged between applications being executed on the divisional screen regions.

FIG. 13 is a diagram illustrating an embodiment of a user interface that information is mutually exchanged between the applications being executed on the divisional screen regions.

Referring to FIG. 13, if an SNS application is executed on a first screen region 1310 and the photo album application is executed on a second screen region 1320, the user selects a thumbnail 1330 corresponding to a photo included in the photo album application by touching on or dragging the thumbnail 1330.

Accordingly, the thumbnail 1330 selected by the user is transferred to the first screen region 1310 with the natural image-changing effect.

Subsequently, although a photo upload control command is not separately input into the SNS application being executed on the first screen region 1310, the transferred photo 1330 is automatically updated.

According to another embodiment, when the user selects a URL (including a location) on the second screen region 1320 by touching on the URL, although a control command is not separately input into the SNS application being executed on the screen region 1310, the transferred location information is automatically updated.

As a result, the input by the user of the control command is minimized by automatically recognizing a type of the selected object, a function of the application being executed, and others.

At this point, the type of the object information to be transferred is changed to a type that can be used in the application to which the object information is to be transferred and then the result of changing the type of the object information is transferred.

Specifically, if the transferred application is the photo album application and the selected object is the text type "APPLE," the type of the corresponding object is converted into an image, and then the result of converting the corresponding object is transferred. As a result, an apple image is transferred to the photo album application.

That is, in this manner, a file conversion between an image file and a text file is performed according to a type of the application that is transferred.

In addition, according to an embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

According to the present invention, the multiple divisional screen regions are executed on the divisional screen regions, respectively, at the same time, and the object, such as the text information or the file, are exchanged between the multiple applications.

In addition, the screen region on which the application is executed is set by adjusting the position of the icon included in the pair icon that is output to the list region.

If when executing a predetermined specific application, a specific control command is input, switching to the screen division mode takes place. As a result, the user convenience can be improved.

The configuration and the method of the embodiments according to the present invention, described above, are not applied in a limiting manner, but all of or some of the embodiments may be selectively combined with each other to create various modifications to the embodiments.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a single touchscreen; and
a controller operably coupled to the touchscreen and configured to:
cause the touchscreen to display a list region in response to a first touch input received at the touchscreen, wherein the list region comprises one or more icons individually for executing an application, wherein the list region further comprises a pair icon including a first icon for executing a first application and a second icon for executing a second application different from the first application;
control the touchscreen to display a home screen page, wherein the first touch input is received when the home screen page is displayed;
control the list region to spread out in a leftward or rightward direction of the touchscreen to overlap the home screen page;
control the touchscreen to dim the home screen page overlapped with the list region, wherein the list region overlapping the home screen is not dimmed;
cause the pair icon to be displayed on a first screen of the touchscreen, wherein the first icon is arranged toward an upper-left portion of the pair icon, and the second icon is arranged toward a lower-right portion of the pair icon and wherein the first icon and the second icon are diagonally arranged within the pair icon;

cause the touchscreen to change from the first screen including the list region to a second screen to disappear the first and second icons included in the pair icon, execute both the first application and the second application, cause a display region of the second screen to be divided into multiple screen regions comprising a first screen region and a second screen region and cause one of first screen information of the first application and second screen information of the second application being executed to be displayed at one of the first and second screen region, in response to a single second touch input received to the pair icon, wherein the first and second screen region on which the first and second applications are executed are changed based on a position of the first and second icons included in the pair icon displayed on the list region, wherein the first and second screen region is determined as one of an upper portion, a lower portion, a left portion, and a right portion of the display region of the second screen based on the position of the first and second icons and whether the mobile terminal is being viewed in a portrait mode or in a landscape mode, wherein when the mobile terminal is being viewed in the portrait mode, and in response to the single second touch input received to the pair icon, the display region is divided into the upper portion and the lower portion having a same size in a horizontal distance, and the first screen information corresponding to the first icon is displayed at the first screen region positioned at the upper portion and the second screen information corresponding to the second icon is displayed at the second screen region positioned at the lower portion, and wherein positioning of the first screen region at the upper portion and positioning of the second screen region at the lower portion are based on the mobile terminal being viewed in the portrait mode and the first icon being arranged in the upper-left portion of the pair icon and the second icon being arranged in the lower-right portion of the pair icon, respectively, the upper portion and the lower portion are both displayed from a left end to a right end of the display region, and wherein when the mobile terminal is being viewed in the landscape mode, and in response to the single second touch input received to the pair icon, the display region is divided into the left portion and the right portion having a same size in a vertical distance, and the first screen information corresponding to the first icon is displayed at the first screen region positioned at the left portion and the second screen information corresponding to the second icon is displayed at the second screen region positioned at the right portion, and wherein positioning of the first screen region at the left portion and positioning of the second screen region at the right portion are based on the mobile terminal being viewed in the landscape mode and the first icon being arranged in the upper-left portion of the pair icon and the second icon being arranged in the lower-right portion of the pair icon, respectively.

2. The mobile terminal of claim 1, wherein the first screen information is an execution screen associated with the first icon arranged toward the upper-left portion of the pair icon, and the second screen information is an execution screen associated with the second icon arranged toward the lower-right portion of the pair icon.

3. The mobile terminal of claim 1, wherein the controller is further configured to:

transfer a first object to the second application being executed on the second screen region, when the first object included in the first application being executed on the first screen region is selected, control the second application being executed on the second screen region to perform a predetermined function using the first object.

4. The mobile terminal of claim 1, wherein the one or more icons of the list region include at least one icon corresponding to at least one frequently used application.

5. The mobile terminal of claim 1, wherein at least one icon of the one or more icons of the list region corresponds to a single application.

6. The mobile terminal of claim 1, wherein the controller is further configured to:

control the touchscreen to stop the displaying of the list region and display an indicator after the single second touch input is received, wherein the indicator is linked to the list region and includes a bar shape.

7. The mobile terminal of claim 1, wherein the controller is further configured to:

control the touchscreen to display a home screen page while the list region is displayed.

8. The mobile terminal of claim 1, wherein the controller is further configured to:

control the touchscreen to display screen information of an application while the list region is displayed.

9. The mobile terminal of claim 8, wherein when the single second touch input selecting the pair icon is received while in a state where the screen information of the application is displayed, the screen information of the application is switched to the first screen information of the first application and the second screen information of the second application.

10. The mobile terminal of claim 1, wherein the location of the first screen region relative to the location of the second screen region corresponds to the location of the first icon relative to the location of the second icon within the pair icon.

11. The mobile terminal of claim 1, wherein the location of the first screen region relative to the location of the second screen region is determined by the location of the first icon relative to the location of the second icon within the pair icon.

12. The mobile terminal of claim 1, wherein a position of the first icon within the pair icon relative to a position of the second icon within the pair icon is maintained such that an appearance of the pair icon is not changed regardless of whether the mobile terminal is in the portrait mode or in the landscape mode.

13. A display method for a mobile terminal having a single touchscreen, the method comprising:

displaying, on the touchscreen, a list region in response to a first touch input received at the touchscreen, wherein the list region comprises one or more icons individually for executing an application, wherein the list region further comprises a pair icon including a first icon for executing a first application and a second icon for executing a second application different from the first application; controlling the pair icon to be displayed on a first screen of the touchscreen, wherein the first icon is arranged toward an upper-left portion of the pair icon, and the second icon is arranged toward a lower-right portion of the pair icon and wherein the first icon and the second icon are diagonally arranged within the pair icon;

controlling the touchscreen to display a home screen page, wherein the first touch input is received when the home screen page is displayed;

controlling the list region to spread out in a leftward or rightward direction of the touchscreen to overlap the home screen page;

controlling the touchscreen to dim the home screen page overlapped with the list region, wherein the list region overlapping the home screen is not dimmed;

controlling the touchscreen to change from the first screen including the list region to a second screen to disappear the first and second icons included in the pair icon, executing both the first application and the second application, controlling a display region of the second screen to be divided into multiple screen regions comprising a first screen region and a second screen region and controlling one of first screen information of the first application and second screen information of the second application being executed to be displayed at one of the first and second screen region, in response to a single second touch input received to the pair icon, wherein the first and second screen region on which the first and second applications are executed are changed based on a position of the first and second icons included in the pair icon displayed on the list region, wherein the first and second screen region is determined as one of an upper portion, a lower portion, a left portion, and a right portion of the display region of the second screen based on the position of the first and second icons and whether the mobile terminal is being viewed in a portrait mode or in a landscape mode, wherein when the mobile terminal is being viewed in the portrait mode, and in response to the single second touch input received to the pair icon, the display region is divided into the upper portion and the lower portion having a same size in a horizontal distance, and the first screen information corresponding to the first icon is displayed at the first screen region positioned at the upper portion and the second screen information corresponding to the second icon is displayed at the second screen region positioned at the lower portion, and wherein positioning of the first screen region at the upper portion and positioning of the second screen region at the lower portion are based on the mobile terminal being viewed in the portrait mode and the first icon being arranged in the upper-left portion of the pair icon and the second icon being arranged in the lower-right portion of the pair icon, respectively, the upper portion and the lower portion are both displayed from a left end to a right end of the display region, wherein when the mobile terminal is being viewed in the landscape mode, and in response to the single second touch input received to the pair icon, the display region is divided into the left portion and the right portion having a same size in a vertical distance, and the first screen information corresponding to the first icon is displayed at the first screen region positioned at the left portion and the second screen information corresponding to the second icon is displayed at the second screen region positioned at the right portion, and wherein positioning of the first screen region at the left portion and positioning of the second screen region at the right portion are based on the mobile terminal being viewed in the landscape mode and the first icon being arranged in the upper-left portion of the pair icon and the second icon being arranged in the lower-right portion of the pair icon, respectively.

14. The method of claim 13, wherein the first screen information is an execution screen associated with the first icon arranged toward the upper-left portion of the pair icon, and the second screen information is an execution screen associated with the second icon arranged toward the lower-right portion of the pair icon.

15. The method of claim 13, further comprising:
transferring a first object to the second application being executed on the second screen region, when the first object included in the first application being executed on the first screen region is selected,
controlling the second application being executed on the second screen region to perform predetermined function using the first object.

16. The method of claim 13, wherein the one or more icons of the list region include at least one icon corresponding to at least one frequently used application.

17. The method of claim 13, wherein at least one icon of the one or more icons of the list region corresponds to a single application.

18. The method of claim 13, further comprising:
stopping the displaying of the list region and display an indicator after the single second touch input is received, wherein the indicator is linked to the list region and includes a bar shape.

19. The method of claim 13, further comprising:
displaying, on the touchscreen, a home screen page while the list region is displayed.

20. The method of claim 13, further comprising:
displaying, on the touchscreen, screen information of an application while the list region is displayed.

21. The method of claim 20, wherein when the single second touch input selecting the pair icon is received while in a state where the screen information of the application is displayed, the screen information of the application is switched to the first screen information of the first application and the second screen information of the second application.

22. The method of claim 13, wherein the location of the first screen region relative to the location of the second screen region corresponds to the location of the first icon relative to the location of the second icon within the pair icon.

23. The method of claim 13, wherein the location of the first screen region relative to the location of the second screen region is determined by the location of the first icon relative to the location of the second icon within the pair icon.

24. The method of claim 13, wherein a position of the first icon within the pair icon relative to a position of the second icon within the pair icon is maintained such that an appearance of the pair icon is not changed regardless of whether the mobile terminal is in the portrait mode or in the landscape mode.

* * * * *